US010005518B2

(12) United States Patent
Guida

(10) Patent No.: US 10,005,518 B2
(45) Date of Patent: Jun. 26, 2018

(54) AUTOMATIC TRACTION CONTROL FOR FRICTION DRIVES

(71) Applicant: ShareRoller LLC, New York, NY (US)

(72) Inventor: Jeffrey E. Guida, New York, NY (US)

(73) Assignee: ShareRoller LLC, New York, NY (US)

( * ) Notice: Subject to any disclaimer, the term of this patent is extended or adjusted under 35 U.S.C. 154(b) by 0 days. days.

(21) Appl. No.: 15/231,731

(22) Filed: Aug. 8, 2016

(65) Prior Publication Data
US 2016/0347408 A1 Dec. 1, 2016

Related U.S. Application Data

(60) Provisional application No. 62/243,661, filed on Oct. 19, 2015.

(51) Int. Cl.
*B62M 6/75* (2010.01)
*B62M 6/45* (2010.01)
(Continued)

(52) U.S. Cl.
CPC .............. *B62M 6/75* (2013.01); *B62M 6/45* (2013.01); *B63B 25/002* (2013.01); *F16B 2/065* (2013.01);
(Continued)

(58) Field of Classification Search
CPC .................................. B62M 6/50; B62M 6/75
See application file for complete search history.

(56) References Cited

U.S. PATENT DOCUMENTS

| | | |
|---|---|---|
| 1,191,287 A | 7/1916 | Du Vaux |
| 2,578,886 A | 12/1951 | Isherwood |

(Continued)

FOREIGN PATENT DOCUMENTS

| | | |
|---|---|---|
| EP | 0155185 A2 | 9/1985 |
| EP | 1398265 A1 | 3/2004 |

(Continued)

OTHER PUBLICATIONS hittp://rk.nvg.ntnu.no/sinclair/vehicles/zeta.htm, Chris Owen, 2003.
(Continued)

*Primary Examiner* — Khoi H Tran
*Assistant Examiner* — Kelly D Williams
(74) *Attorney, Agent, or Firm* — Aaron Perez-Daple

(57) ABSTRACT

The disclosure relates to improved friction drive systems, control algorithms for friction drive systems, and automatic traction control for friction drive systems. Embodiments of friction drive systems and methods may improve control over an amount of normal force on a contact surface on a friction drive (e.g., disposed on a drive motor) and a tire or wheel of a wheeled vehicle. Embodiments of friction drive systems and methods may dynamically adjust the normal force between the contact surface and the tire or wheel in response to rapidly changing conditions, such as weather, road surface, and/or tire inflation. Embodiments of an automatic traction control system may adjust the normal force to avoid slippage while minimizing tire wear and maximizing battery efficiency. Embodiments of friction drive systems and methods may allow a user to calibrate or adjust the amount of normal force delivered based on their preferences or based on a selected mode of operation.

25 Claims, 25 Drawing Sheets

(51) Int. Cl.
  *B63B 25/00* (2006.01)
  *F16B 2/06* (2006.01)
  *B62M 7/10* (2006.01)
  *B62M 7/08* (2006.01)
  *H02G 3/32* (2006.01)
  *F16L 55/172* (2006.01)
  *B62J 11/00* (2006.01)

(52) U.S. Cl.
  CPC ............... *B62J 11/00* (2013.01); *B62M 7/08* (2013.01); *B62M 7/10* (2013.01); *F16L 55/172* (2013.01); *H02G 3/32* (2013.01)

(56) References Cited

U.S. PATENT DOCUMENTS

| | | |
|---|---|---|
| 3,431,994 A | 3/1969 | Wood |
| 3,841,428 A | 10/1974 | Bialek |
| 3,905,442 A | 9/1975 | O'Niell |
| 3,966,007 A | 6/1976 | Havener |
| 4,081,048 A * | 3/1978 | Hendricks ............. B62M 13/02 180/206.3 |
| 4,113,043 A | 9/1978 | Palmer |
| 4,175,629 A | 11/1979 | Kalajzich |
| 4,386,675 A | 6/1983 | Landon |
| 4,579,188 A | 4/1986 | Facer |
| 4,637,274 A | 1/1987 | Goldenfeld |
| 5,078,227 A | 1/1992 | Becker |
| 5,423,393 A | 6/1995 | Felt |
| 5,470,281 A | 11/1995 | Sinclair |
| 5,491,390 A | 2/1996 | McGreen |
| 5,735,363 A | 4/1998 | Horovitz |
| 5,778,998 A | 7/1998 | Shih |
| 5,816,355 A | 10/1998 | Battlogg |
| 5,836,414 A | 11/1998 | Seto |
| 5,842,535 A | 12/1998 | Dennis |
| 6,065,557 A | 5/2000 | Von Keyserling |
| 6,102,148 A | 8/2000 | Chien |
| 6,227,324 B1 | 5/2001 | Suave |
| 6,318,491 B1 | 11/2001 | Tung |
| 6,497,299 B1 | 12/2002 | Sinclair |
| 7,441,621 B2 | 10/2008 | Motte |
| 8,573,346 B2 | 11/2013 | Duignan |
| 8,602,148 B2 | 12/2013 | Shwartz |
| 2002/0027026 A1 | 3/2002 | Hong |
| 2002/0079855 A1 | 6/2002 | Parks |
| 2004/0251068 A1 | 12/2004 | Chen |
| 2008/0147281 A1 * | 6/2008 | Ishii ................... B62D 51/005 701/49 |
| 2011/0114407 A1 | 5/2011 | Lee |
| 2011/0168471 A1 * | 7/2011 | Duignan ............... B62M 6/75 180/205.7 |
| 2011/0232985 A1 | 9/2011 | Lee |
| 2013/0225360 A1 | 8/2013 | Hirn |
| 2016/0121963 A1 * | 5/2016 | Tanaka ................. B60L 7/10 701/22 |
| 2016/0167734 A1 | 6/2016 | Olsommer |
| 2016/0167735 A1 | 6/2016 | Olsommer |

FOREIGN PATENT DOCUMENTS

| | | | |
|---|---|---|---|
| JP | WO 2014200081 A1 * | 12/2014 | ............... B60L 7/10 |
| KR | 101249809 | 2/2013 | |
| KR | 101249809 | 4/2013 | |
| WO | WO/2015/114614 | 6/2015 | |

OTHER PUBLICATIONS hittp://web.archive.org/web/20150118005734/http://rubbee.co.uk/, web archive of rubbee.co.uk, dated Jan. 18, 2015.
PCT US16/56569, International Search Report, dated Jan. 19, 2017.

* cited by examiner

THROTTLE DEPRESS / RELEASE ALGORITHM

AUTOMATIC TRACTION CONTROL FOR FRICTION DRIVES

CROSS-REFERENCE TO RELATED APPLICATIONS

This application claims the benefit of U.S. Provisional Patent Application No. 62/243,661, filed on Oct. 19, 2015, which is hereby incorporated by reference in its entirety.

FIELD OF INVENTION

The inventions disclosed herein relate to the field of friction drive systems, including friction drive systems that are capable of powering wheeled vehicles such as bicycles, scooters, wheelchairs, skateboards, strollers, wagons, tricycles, and other human powered vehicles. However, the inventions disclosed herein have applications beyond wheeled vehicles and may also be used with other devices, such as motorcycles, remote control vehicles, robots, wind turbines, manufacturing systems, conveyor belts, railcars, trains, printers, toys and consumer devices, among others.

BACKGROUND

Friction drive systems for powering wheeled vehicles, such as bicycles, have existed for many years. These systems deliver power through direct contact with the wheel or tire of the vehicle. Typically, a motor is mounted in a fixed position adjacent to one of the wheels. The motor can then either drive the wheel through a secondary roller mechanism pressed against the tire or directly via tire contact with the rotating outer shell of an outrunner-type motor.

A contact surface on the rotating mechanism of the friction drive presses against the tire, thereby delivering mechanical power to the wheel. Friction between the contact surface and the tire keeps the tire from slipping (relative to the contact surface) and allows power to be transferred from the motor to the wheel. The force of friction equals the normal force (of the contact surface against the tire) times the coefficient of friction, which may be expressed as follows:

$$F_f = \mu * F_N$$

where $F_f$ is the force of friction, $\mu$ is the coefficient of friction, and $F_N$ is the normal force between the contact surface and the tire. The coefficient of friction is subject to change based on conditions like the weather. For example, when it rains and the tire becomes wet, the coefficient of friction typically drops significantly, reducing the force of friction for a given normal force. As another example, the coefficient of friction may be reduced if the tire becomes dusty or muddy.

When the coefficient of friction is suddenly reduced—for example, when the tire becomes wet after going through a puddle—slippage can occur between the tire and the contact surface. Such slippage can be dangerous, because it can result in sudden and unpredictable changes to the power delivered to the wheel. For example, after slipping, the tire may suddenly reengage (or "catch") with the contact surface, causing a sudden increase in the power delivered to the wheel and in the resulting speed of the vehicle.

Known friction drive systems have difficulty responding to rapid changes in the amount of friction caused by weather (e.g., rain or snow), road conditions (e.g., dust or dirt), and other factors (e.g., loss of air in the tire). Some known systems use contact surfaces, such as sandpaper, having a high coefficient of friction to reduce slippage during changing conditions. However, such high-friction surfaces dramatically increase tire wear. Moreover, the sandpaper (or other high-friction surface) needs to be regularly replaced as it wears down, which is a tedious and time consuming process that requires regular monitoring by the consumer.

Another way to protect a friction drive system against changes in friction (e.g., due to changing road conditions) is to adjust the normal force between the contact surface and the tire. For example, a friction drive system could be configured to always provide a large normal force between the contact surface and the tire. However, continuously maintaining a large normal force requires more power due to tire churning, which drains the battery, and also increases tire wear.

In most known systems, the position of the contact surface relative to the tire is fixed when the friction drive system is installed. This fixed position, in turn, determines the normal force. In other systems, the normal force is set by a spring mechanism, gravity, or other biasing force. Still other systems provide a limited ability to adjust the normal force by manually reconfiguring the system, for example, by pulling a lever, however, such systems are difficult to control and typically require the user to stop the vehicle and dismount in order to change the settings.

None of these known friction drive systems provide a simple mechanism for adjusting the normal force. None of these known friction drive systems adjust the normal force dynamically in response to changing road conditions, weather, and the like. None of these known friction drive systems provide automatic traction control between the friction drive and the tire (or wheel). None of these known systems optimize the normal force to provide sufficient friction to avoid slippage while minimizing tire wear and maximizing battery efficiency.

Another problem with known friction drive systems is that they do not automatically disengage from the tire (or wheel) when the motor is no longer in use. Engaging with the tire (or wheel) when the motor is not actively providing power causes drag on the system, reduces efficiency, and slows the vehicle. Some known systems permit the user to manually disengage the motor by means of a lever or similar mechanism, which moves the contact surface away from the tire. However, such systems are inefficient because the user frequently forgets to disengage the contact surface or is unable to disengage (and reengage) the contact surface with optimal timing. Such known systems can also be dangerous; if the user reengages the contact surface when it is spinning at a high-differential speed compared to the wheel, the power delivered to the wheel (and the resulting speed of the vehicle) may change suddenly and unpredictably.

Accordingly, there is a need in the art for friction drive systems—and control algorithms for such systems—that can better adjust to changes in friction caused by road conditions, weather, and the like. There is a need in the art for an automatic traction control system for a friction drive that avoids slippage while minimizing tire wear and maximizing battery efficiency. There is also a need in the art for a system and method of automatically disengaging and reengaging the contact surface of a friction drive with the tire (or wheel) of a wheeled vehicle in a safe and efficient manner.

SUMMARY OF THE DISCLOSURE

The present disclosure includes improved friction drive systems, control algorithms for friction drive systems, and automatic traction control for friction drive systems.

Embodiments of the present disclosure may improve control over an amount of normal force between a contact surface on a friction drive (e.g., disposed on a drive motor) and a tire or wheel of a wheeled vehicle. Embodiments of the present disclosure may include an automatic traction control system for a friction drive that automatically adjusts the normal force to avoid slippage while minimizing tire wear and maximizing battery efficiency. Embodiments of the present disclosure may dynamically adjust the normal force between the contact surface and the tire (or wheel) in response to rapidly changing conditions, such as weather, road surface, and/or tire inflation. Embodiments of the present disclosure may allow a user to calibrate or adjust the amount of normal force delivered based on their preferences or based on a selected mode of operation. Embodiments of the present disclosure may automatically disengage and reengage the contact surface of a friction drive with the tire (or wheel) of a wheeled vehicle in a safe and efficient manner.

Embodiments of the present disclosure may include an initialization procedure for determining a starting position of the contact surface relative to the tire, which advantageously may allow for rapid engagement with the tire when power is needed. Embodiments of the present disclosure may include a procedure for automatically engaging and disengaging the contact surface with the tire, such that engagement occurs when the motor is delivering power. Embodiments of the present disclosure may deliver power to the drive motor in response to a throttle mechanism. Embodiments of the present disclosure may include a Tailwind operating mode that simulates the effect of a tailwind by providing a constant level of power to the drive motor. Embodiments of the present disclosure may deliver power to the drive motor in response to a Pedal Assist Sensor.

As would be understood by a person of skill in the art, embodiments of the present disclosure have applications beyond wheeled vehicles and may be used to improve the function, control, and performance of friction drive systems generally.

The present disclosure includes embodiments of a friction drive system having a drive assembly, a control unit, and a battery unit. The drive assembly may include a motor and a contact surface capable of engaging with a tire of a wheeled vehicle. The control unit may include an automatic traction control system capable of automatically adjusting an amount of friction between the contact surface and the tire when the friction drive system is mounted to the wheeled vehicle. The control unit may determine an amount of electrical current to deliver from the battery unit to the motor based at least in part on an input signal.

The present disclosure includes embodiments of a friction drive system having a drive assembly including a motor and a pivot mechanism. A contact surface may be disposed on the motor, and the motor may be attached to an end of the pivot mechanism. An automatic traction control system may be capable of automatically adjusting an angle of the pivot mechanism in response to one or more sensed conditions.

The present disclosure includes embodiments of a method for automatic traction control of a friction drive system in which a pivot mechanism may be rotated by powering a gear motor until a current drawn by the gear motor exceeds a threshold value. A first speed of a drive motor connected to the pivot mechanism may be detected when the drive motor is unpowered. Power may be applied to the drive motor such that a second speed of the drive motor matches the detected first speed of the unpowered drive motor. Power to the drive motor may be increased until the drive motor reaches a third speed determined at least in part from an input signal. Power to the drive motor may be cut when a rate of change of drive motor speed exceeds a threshold value.

The present disclosure includes embodiments of a friction drive system having a battery unit capable of delivering power to a drive assembly. The drive assembly may include a motor and a contact surface and have a means for automatically controlling an amount of normal force delivered by the contact surface in response to one or more sensed conditions. The drive assembly may also include a pivot mechanism and the contact surface may be disposed on a rotating mechanism attached to the pivot mechanism (e.g., a drive motor or roller).

The present disclosure includes embodiments of a method for automatic traction control of a friction drive system in which a pivot mechanism may be rotated with a gear motor until a current drawn by the gear motor exceeds a threshold value. A first speed of a drive motor connected to the pivot mechanism may be detected when the drive motor is unpowered. Power may be applied to the drive motor such that a second speed of the drive motor matches the detected first speed of the unpowered drive motor. Power to the drive motor may be increased until the drive motor reaches a third speed determined at least in part from an input signal. Power to the drive motor may be reduced (including up to cutting the power completely) when a rate of change of drive motor speed exceeds a threshold value. After reducing power to the drive motor, the pivot mechanism may be rotated such that the current drawn by the gear motor increases.

The foregoing discussion in the Summary of the Disclosure is for example only and is not intended to limit the scope of the claimed invention(s) or the embodiments described below.

DETAILED DESCRIPTION

Figure 1A:
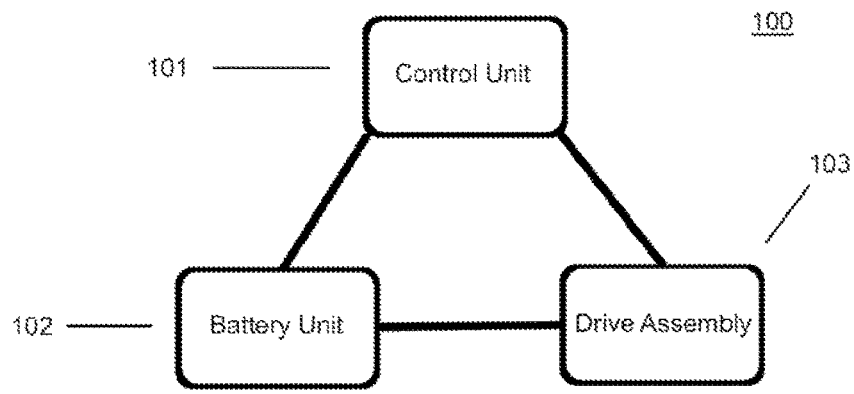
FIG. 1A is a block diagram showing an embodiment of a friction drive system with a battery unit, control unit, and drive assembly.

As shown in FIG. 1A, in embodiments of the disclosure, friction drive system 100 may include control unit 101, battery unit 102, and drive assembly 103. Battery unit 102 may provide electrical power to control unit 101 and/or to drive assembly 103. Control unit 101 may provide control information and/or commands to battery unit 102 and/or drive assembly 103. Drive assembly 103 may provide power to a tire or wheel of a wheeled vehicle, or it may provide power to a hub or crank assembly, or it may provide power to and/or portion of the wheeled vehicle. In various embodiments of the disclosure, control unit 101, battery unit 102, and drive assembly 103 may be provided as separate connecting units or as a single integrated unit. Friction drive system 100 also may be integrated with a wheeled vehicle, for example, as an electric bicycle or scooter.

Figure 1B:
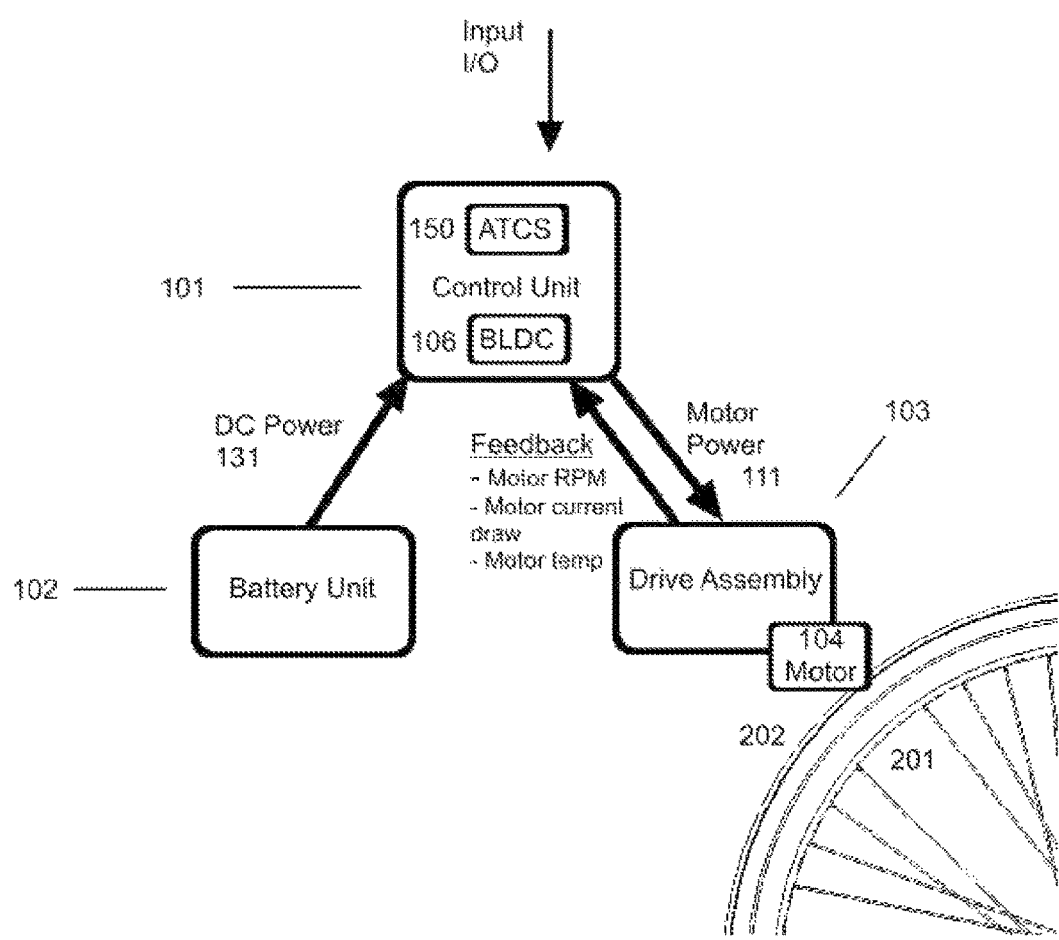
FIG. 1B is a block diagram showing another embodiment of a friction drive system with a battery unit, control unit, and drive assembly.

As shown in the embodiment of FIG. 1B, drive assembly 103 may include motor 104 and, optionally, one or more rollers (not shown). Drive assembly 103 may be capable of engaging with tire 202 (or directly with wheel 201), such that motor 104 delivers mechanical power to wheel 201. For example, drive assembly 103 may engage with tire 202 via a contact surface disposed on the outer surface of motor 104 and/or on one or more rollers. Control unit 101 may interact with battery unit 102 to control the amount of electrical power delivered to drive assembly 103 (and motor 104), thereby controlling the amount of mechanical power delivered to wheel 201. In embodiments of the disclosure, wheel 201 may be a front or a rear wheel of a bicycle, for example.

As shown in FIG. 1B, control unit 101 may include brushless DC motor controller ("BLDC") 106. BLDC 106 may regulate the delivery of electrical current (and/or power) from battery unit 102 to drive assembly 103. For example, electrical current may flow from battery unit 102 to BLDC 106 and then to drive assembly 103 via power lines 131 and 111. BLDC 106 may regulate the amount of current (and/or power) delivered to drive assembly 103 in response to commands from control unit 101. In some embodiments, power line 111 may include at least three high-power signals for delivering electrical current to motor 104. Other signals also may be provided in power line 111, such as signals for delivering information about the sensed position of motor 104 to BLDC 106, as would be understood by a person of skill in the art in view of the present disclosure. In other embodiments, not shown, drive assembly 103 may include BLDC 106 and/or additional components (e.g., hardware, firmware, circuitry) for controlling electrical current delivered to motor 104.

As would be understood by a person of skill in the art in view of the present disclosure, the physical relationships between electrical current, voltage, and power are well-known and these values can be calculated from one another, given other known parameters of the system (e.g., electrical resistance). In addition, for any given motor, motor torque may be calculated from motor current. Thus, control decisions may be based on electrical current, power, voltage, and/or motor torque (in addition to other parameters). In embodiments of the disclosure, a control algorithm running on a processor in control unit 101 may determine a desired electrical current to supply from BLDC 106 to motor 104.

As shown in FIG. 1B, control unit 101 may receive input signal 110. Input signal 110 may be generated in response to a user input. Input signal 110 may be delivered over a physical cable or wirelessly using Bluetooth, IEEE 802.11, or other suitable wireless technology. For example, input signal 110 may be generated by a throttle mechanism (such as the throttle 115 in FIG. 1C) operated by a user, and input signal 110 may contain information representing the amount of activation of the throttle mechanism (e.g., in the form of an analog or digital signal). Control unit 101 may then use input signal 110 to determine how much electrical current (and/or power) should be delivered to drive assembly 103, for example, by increasing the amount of current as the throttle is activated further (e.g., as the user presses the throttle inward). In some embodiments, feedback signal 112 may provide control unit 101 with information from drive assembly 103, including information about motor 104, such as motor RPM, motor current draw, motor phase position, and/or motor temperature. Feedback signal 112 also may include other information, such as power and torque information, as well as measured properties of wheel 201 and/or tire 202 (e.g., wheel speed, acceleration, surface properties) and other sensed information. Feedback line 112 may be provided separately or together with power line 111. Alternatively, feedback may be provided wirelessly using Bluetooth, IEEE 802.11, or other suitable wireless technology. As discussed further below, control unit 101 also may include Automatic Traction Control System ("ATCS") 150 for automatically adjusting an amount of friction between motor 104 and tire 202.

Control unit 101 and ATCS 150 may include memory for storing information, such as information about the state of friction drive system 100 and/or wheeled vehicle 200. As used herein, "memory" may include RAM, ROM, buffers, registers, or other electronic means of storing information, as would be understood by one of skill in the art in view of the present disclosure.

Figure 1C:
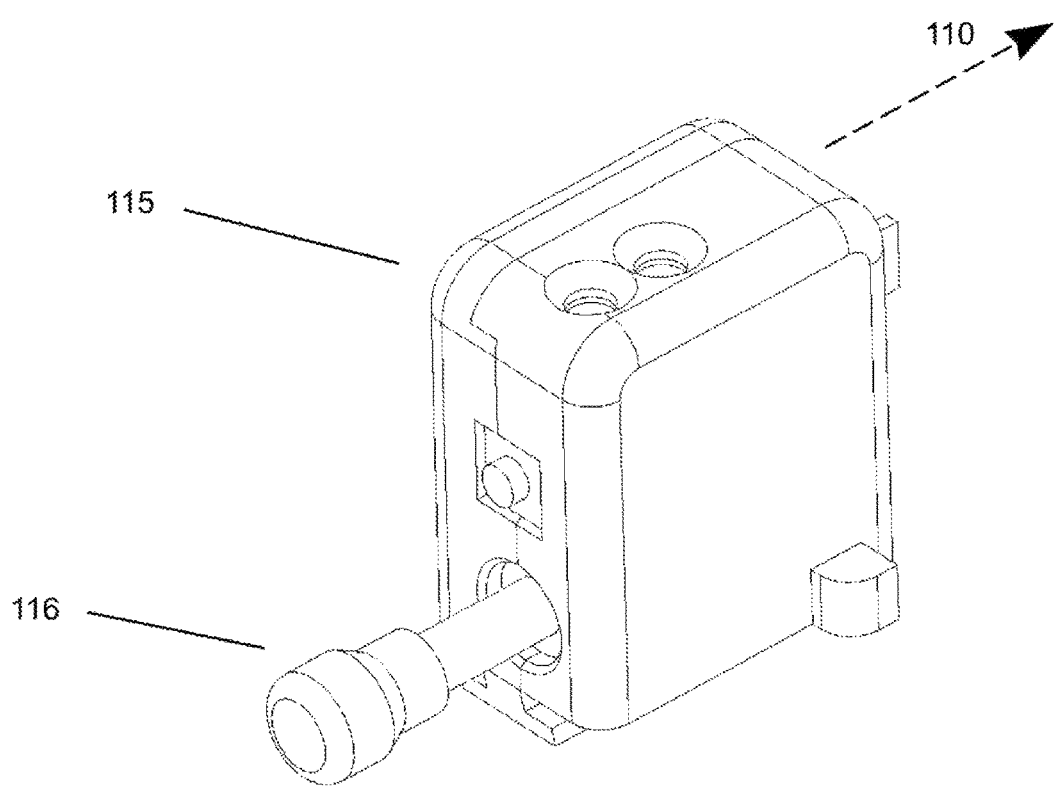
FIG. 1C shows an embodiment of a throttle mechanism that may provide an input signal to the control unit.

FIG. 1C shows an example of a throttle mechanism, throttle 115, that may generate input signal 110 delivered to control unit 101. Throttle 115 may include plunger 116, which may be depressed by a user's thumb when a user desires to power motor 104. Plunger 116 may include a linear position sensor that generates a signal correlated to the position of plunger 116. Alternatively, or in addition, throttle 115 may have a throttle button with a pressure sensor or force sensing resistor that generates a signal correlated to how hard a user presses on the button. In other embodiments, a twist throttle may be used.

In other embodiments of the disclosure, input signal 110 may be generated by a Pedal Assist Sensor ("PAS," not shown), and input signal 110 may contain information representing the torque delivered to the pedals, the speed of pedal rotation, the power delivered to the pedals, and/or other measurable properties of the pedals. Control unit 101 may then use information in input signal 110 to determine how much current (and/or power) to deliver to drive assembly 103, for example, by increasing the amount of current as the pedal torque increases (e.g., as the user presses down harder on the pedals).

In yet other embodiments of the disclosure, input signal 110 may include information generated by both a throttle mechanism and a PAS, and this information may be used together to control the delivery of electrical power to drive assembly 103. For example, the PAS may be used to determine the base level of electrical power, while the throttle mechanism may allow the user to provide extra power from the motor as desired.

In still other embodiments of the disclosure, input signal 110 may be generated by sensors—such as a vehicle speed sensor, accelerometer, or motor current sensor—without requiring user input. For example, input signal 110 may contain information indicating vehicle speed or acceleration, and control unit 101 may use this information to determine how much electrical current to deliver to drive assembly 103. In still further embodiments, input signal 110 may contain information generated by sensors attached to the user—such as a heart rate monitor, blood pressure monitor, fitness tracker, or other wearable device—and this information may be used to determine how much electrical current to deliver to drive assembly 103. For example, control unit 110 may vary the electrical current delivered to drive assembly 103 in order to maintain the user's heart rate within a certain range by decreasing current when the heart rate goes below the target range (requiring the user to pedal harder) and increasing current above the target range (making it easier to pedal). As would be apparent to one of skill in the art in view of the present disclosure, input signal 110 may include various information—provided as one or multiple signals in analog or digital form—which may be used together to make control decisions regarding how much electrical current (and/or power) to deliver to drive assembly 103 (and/or motor 104).

Control unit 101 may use other information—in addition to or instead of input signal 110—in determining how much electrical current to deliver to drive assembly 103. This other information may be measured directly by sensors or may be derived from known physical relationships (e.g., between mechanical power, torque, and speed). For example, control unit 101 may take into account vehicle speed, vehicle acceleration, wheel torque, wheel speed (or RPM), pedal torque, pedal speed, pedal power, motor torque, motor speed (or RPM), motor power, motor current, motor temperature, battery voltage, battery power, battery temperature, and other related factors when determining how much electrical power to deliver to drive assembly 103.

As used herein, the term "motor speed" refers to any quantifiable measurement of the speed of a motor, including RPM and tangential speed. Similarly, the term "wheel speed" refers to any quantifiable measurement of the speed of a wheel, including RPM and tangential speed. It is possible to calculate tangential speed from RPM—and vice-a-versa—given the diameter of the circular body. In embodiments of the disclosure, wheel speed may be determined from motor speed, because the tangential speed of contact surface 109 should equal the tangential speed of tire 202 when the surfaces are engaged without slippage. Furthermore, in embodiments of the disclosure, motor RPM may be used as a proxy for wheel RPM, because the two values normally will be related by a fixed constant.

Embodiments of friction drive system 100 are designed to be portable and easily attachable and removable from a wheeled vehicle. As shown in the exemplary embodiments of FIGS. 2A to 4C, friction drive system 100 may be provided as a single unit, as a unit with detachable components, as multiple separate units with connectable parts, or as stand-alone units.

FIGS. 2A to 2F show an embodiment of friction drive system 100 in which control unit 101, battery unit 102, and drive assembly 103 are disposed as a single unit inside case 120. In some embodiments, case 120 may be composed of plastic, metal, ceramic, or other suitable materials; alternatively, case 120 may include multiple pieces attached together. Case 120 also may include handle 124 for easily carrying friction drive system 100 when it is not attached to a wheeled vehicle.

Figure 2A:
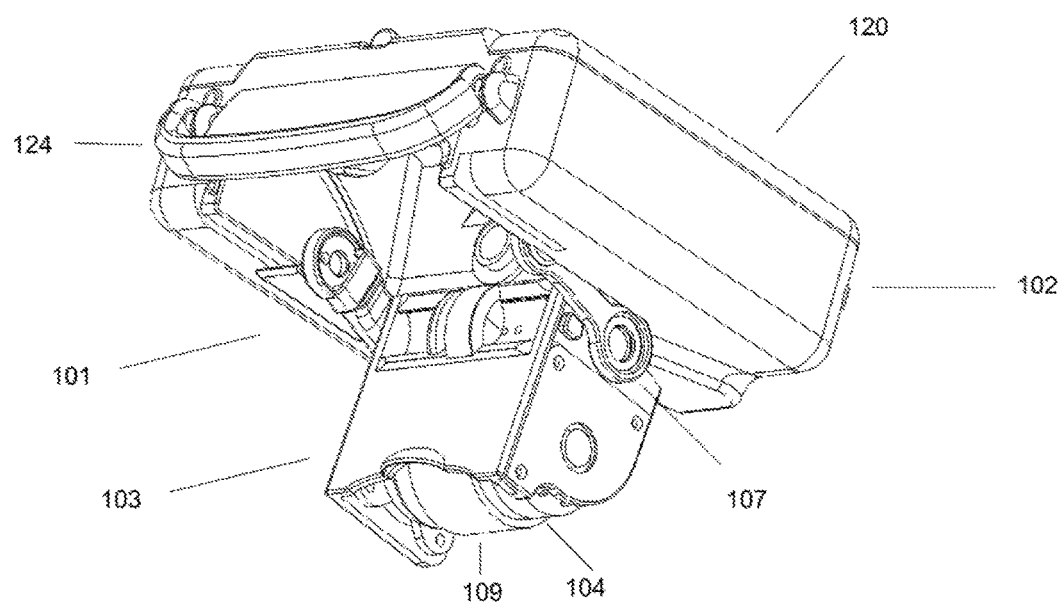
FIG. 2A shows an embodiment of a unitary friction drive system having a pivoting mechanism in an expanded position.

As shown in FIG. 2A, drive assembly 103 may include pivot arm 107, which may allow motor 104 (and/or rollers 105, not shown) to rotate into a position of contact with a tire of a wheeled vehicle, when friction drive system 100 is mounted to the wheeled vehicle. For example, motor 104 may attach to pivot arm 107, and pivot arm 107 may be adjustable between a retracted position and an expanded position. FIG. 2A shows pivot arm 107 in an expanded position with contact surface 109 of motor 104 exposed and capable of engaging with a tire (e.g., when mounted).

Figure 2B:
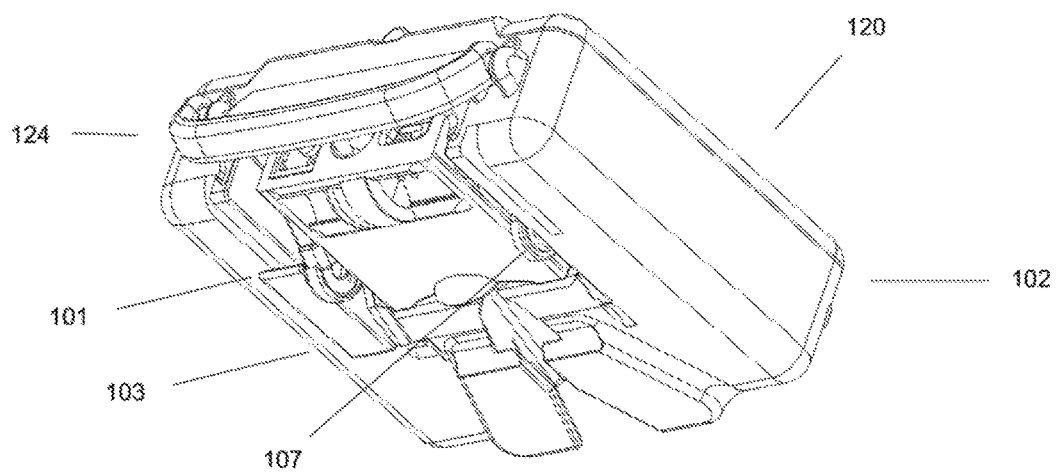
FIG. 2B shows an embodiment of a unitary friction drive system having a pivoting mechanism in a retracted position.

FIG. 2B shows pivot arm 107 in a retracted position with motor 104 partially enclosed within a recess in case 120. Placing pivot arm 107 in the retracted position may protect the motor from damage, protect the user from inadvertent activation of the motor, and/or protect the user from dirt and/or grime on contact surface 109. Friction drive system 100 also may be more streamlined and easier to carry when pivot arm 107 is in the retracted position.

Figure 2C:
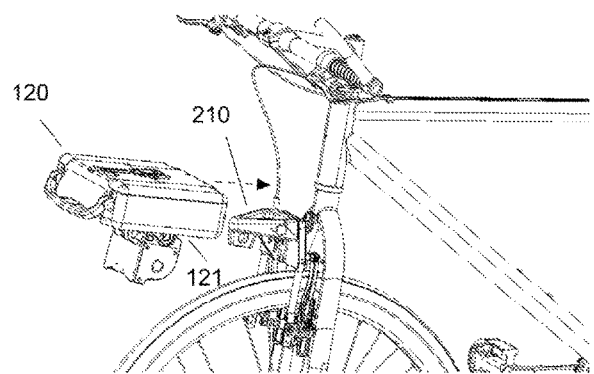
FIG. 2C shows an embodiment of a unitary friction drive system prior to being mounted on a bicycle having a mount.

As shown in FIGS. 2C to 2F, friction drive system 100 also may include mounting mechanism 121 for rapid attachment and removal to/from mount 210 disposed on a wheeled vehicle (e.g., a bicycle). As shown in FIG. 2C, mount 210 on the wheeled vehicle may have a triangular shape. For example, some bike share bicycles have a triangle bracket on the front of the bicycle for interfacing with a docking station; this triangular bracket may serve as mount 210 in embodiments of the disclosure. As another example, a bicycle owner may install a triangular mount on their bicycle for the purpose of mounting friction drive system 100.

Figure 2D:
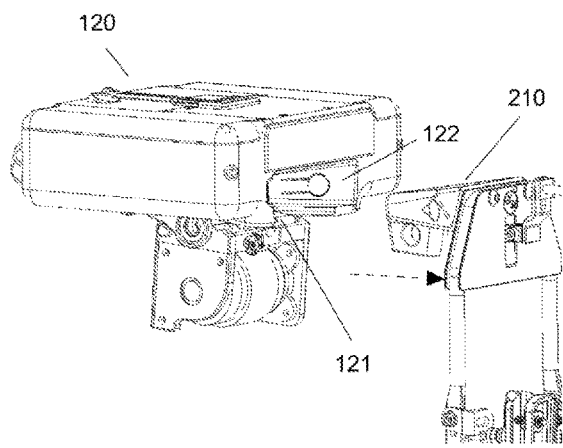
FIG. 2D shows a closer perspective of an embodiment of a unitary friction drive system prior to being mounted on a mount.
Figure 2E:
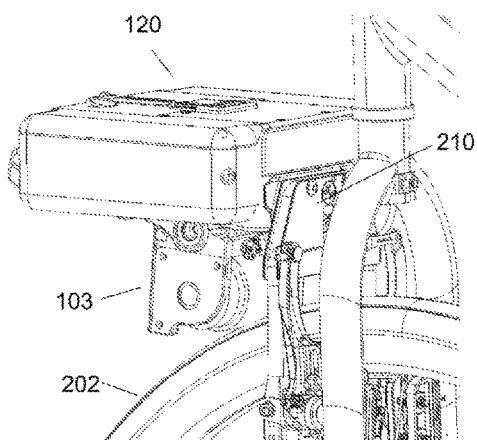
FIG. 2E shows an embodiment of a unitary friction drive system mounted on a bicycle with a pivoting mechanism in an engaged position.
Figure 2F:
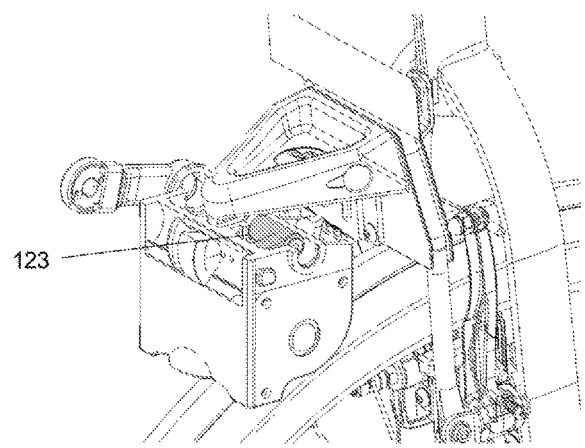
FIG. 2F shows a cut-away view of an embodiment of a unitary friction drive system mounted on a bicycle with a pivoting mechanism in an engaged position.

As shown in FIG. 2D, mounting mechanism 121 may include triangular receptacle 122, which may be formed integral with case 120. The arrow in FIGS. 2C and 2D indicates the direction of motion of case 120 relative to mount 210 when coupling receptacle 122 to mount 210. FIG. 2E shows case 120 coupled to mount 210, such that drive assembly 103 contacts tire 202 when pivot arm 107 is in the expanded position. FIG. 2F is a cut-away view of drive assembly 103 showing sliding plunger mechanism 123 for securely coupling friction drive system 100 to mount 210. For example, sliding plunger mechanism 123 may be spring-loaded and may have a protrusion that slides into a corresponding opening on mount 210.

In view of the present disclosure, a person of skill in the art would understand that mounting mechanism 121 may be configured to couple with various types of mounts, for example, by changing the shape of triangular receptacle 122 and/or the location of sliding plunger mechanism 123 (or other fastening mechanism). Moreover, in embodiments of the disclosure, triangular receptacle 122 may be disposed on other portions of case 120 or separately on battery unit 102 and/or drive assembly 103.

Figure 3A:
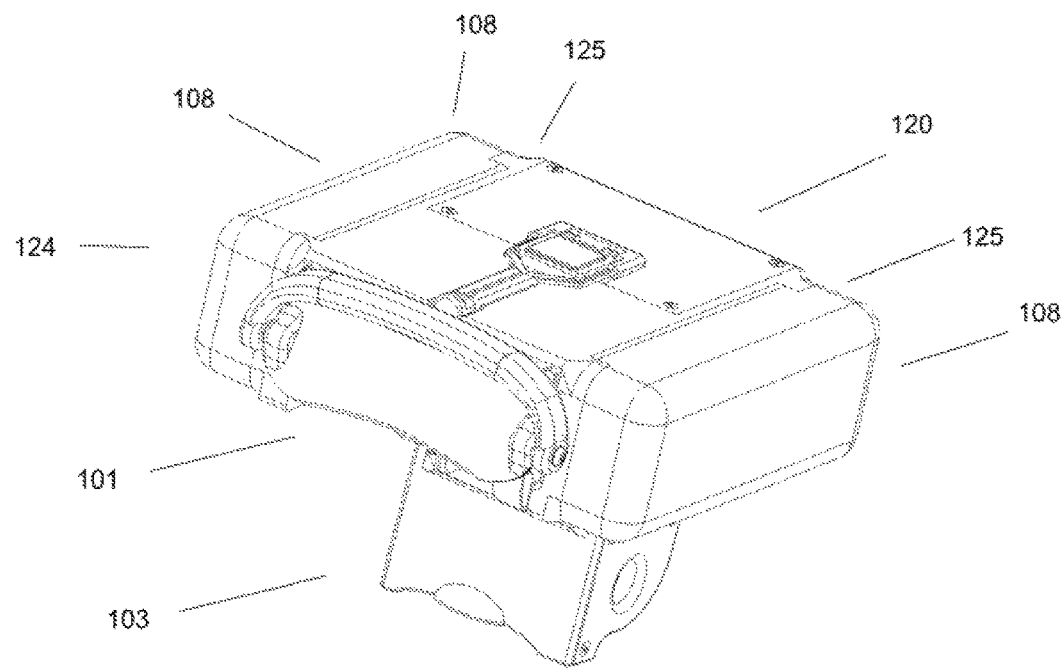
FIG. 3A shows an embodiment of a friction drive system having two battery packs attached to a case.
Figure 3B:
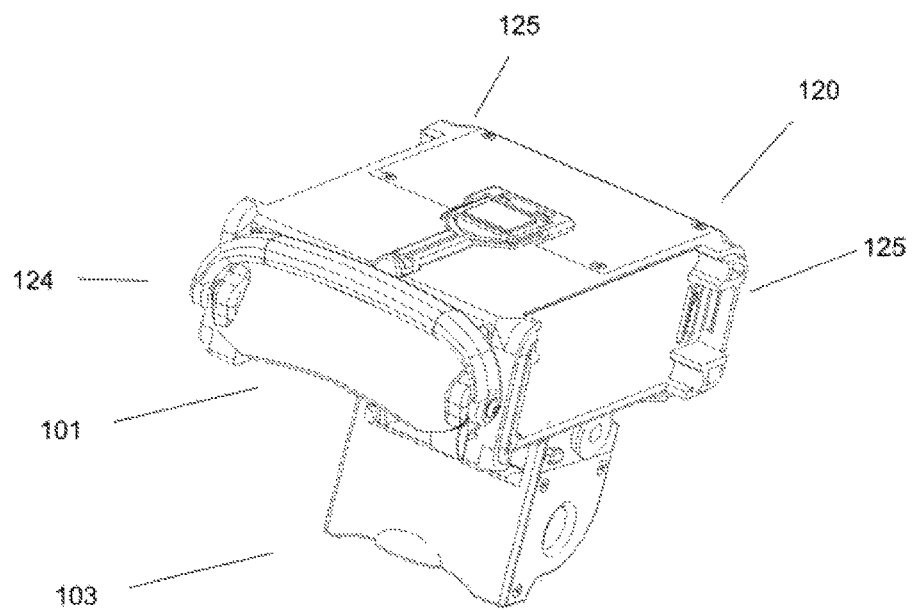
FIG. 3B shows an embodiment of a friction drive system having two battery packs detached from a case.

FIGS. 3A and 3B show an embodiment of friction drive system 100 where battery unit 102 includes two battery packs 108 designed for quick attachment and release from case 120 using quick release mechanism 125. FIG. 3A shows battery packs 108 attached to case 120, and FIG. 3B shows battery packs 108 detached from case 120. In the embodiment of FIGS. 3A and 3B, battery packs 108 may be easily swapped out for fresh batteries when the charge becomes depleted. Moreover, the use of dual battery packs 108 may provide a larger total battery capacity for the system, increasing range. In addition, this embodiment allows for the use of different size batteries in different situations. For example, when traveling, individual battery packs 108 may be sized to comply with air travel restrictions on Lithium-battery sizes; larger battery packs 108 may be used when at home. Other features of the embodiment of FIGS. 3A and 3B may be similar to those described with respect to the embodiment of FIGS. 2A-F.

FIGS. 4A to 4F show embodiments of friction drive system 100 where control unit 101, battery unit 102, and drive assembly 103 are provided in three separate units, which may be attached to one another in various configurations. The three units may be capable of connecting together in any or all of the configuration shown in FIGS. 4A to 4F (and other configurations, not shown), depending on the particular vehicle and the desire of the user. Although FIGS. 4A to 4E depict a bicycle, other wheeled vehicles also may be used.

Figure 4A:
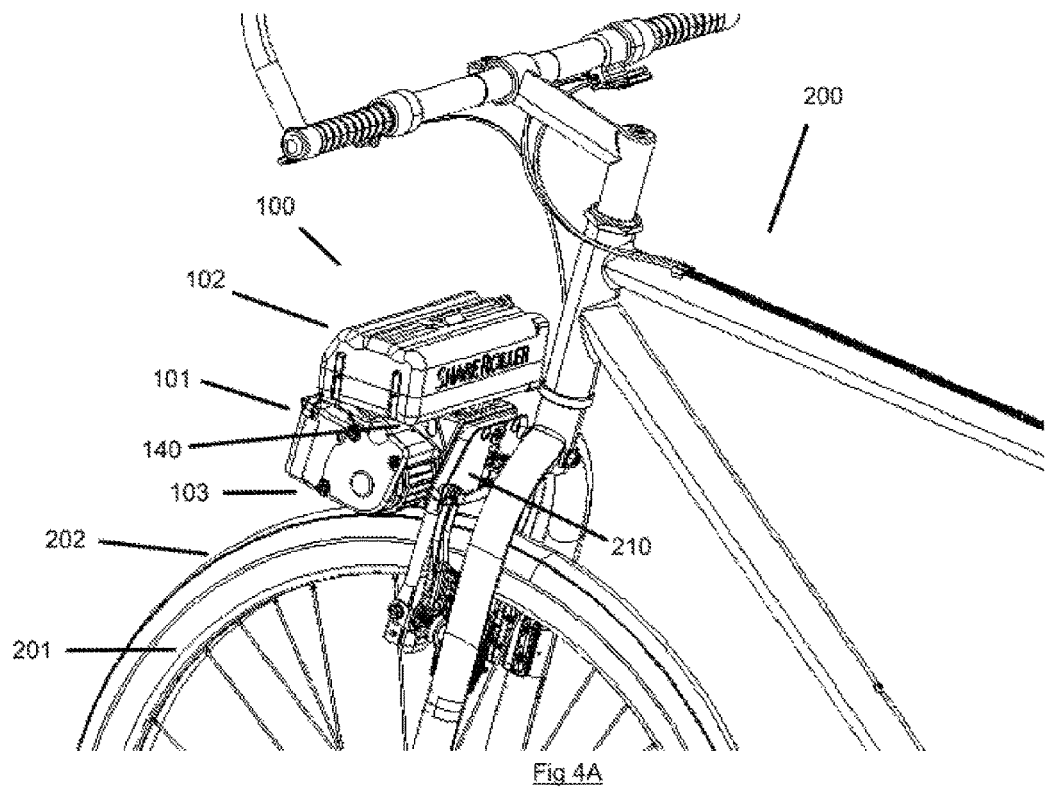
FIG. 4A shows an example of a three-unit embodiment of a friction drive system in which a control unit, a battery unit, and a drive assembly are attached together and mounted adjacent to a front wheel of a wheeled vehicle.

FIG. 4A shows a three-unit embodiment of friction drive system 100 in which control unit 101, battery unit 102, and drive assembly 103 are provided in three separate units; however, in this configuration, all three units attach together and mount to wheeled vehicle 200 adjacent to wheel 201. In the example of FIG. 4A, drive assembly 103 is shown mounted above the front wheel of a bicycle, such that drive assembly 103 may engage with tire 202 (e.g., via contact surface 109 on motor 104). As shown in FIG. 4A, drive assembly 103 may include motor mount assembly 140 for attaching to mount 210 on wheeled vehicle 200. Alternatively, a mounting mechanism may be disposed on control unit 101 and/or battery unit 102.

Figure 4B:
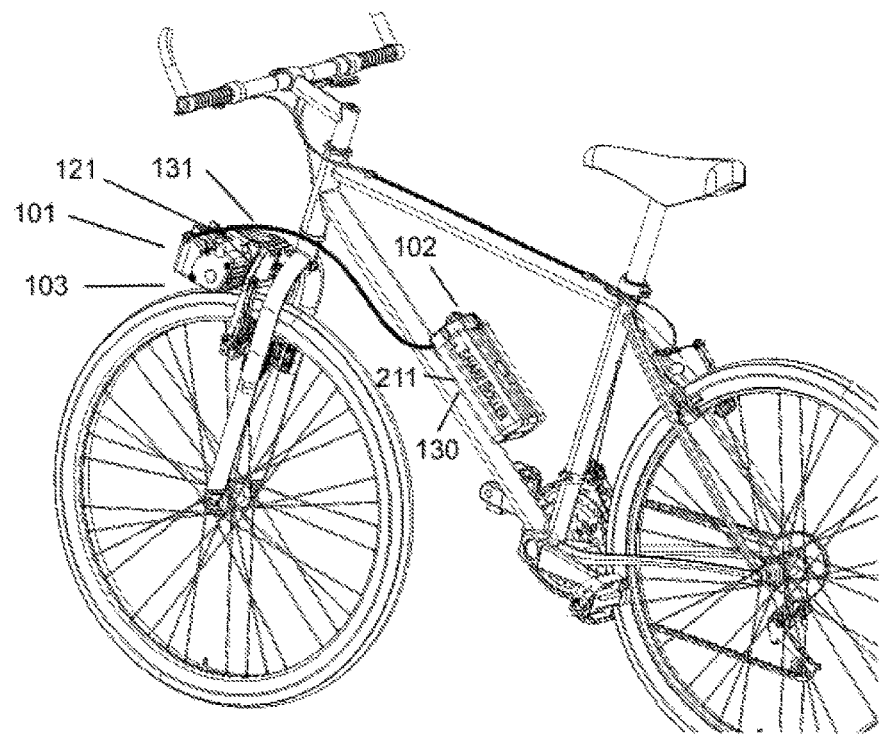
FIG. 4B shows an example of a three-unit embodiment of a friction drive system in which a control unit and a drive assembly are attached together and mounted adjacent to a front wheel of a wheeled vehicle; and a battery pack is mounted to a frame of the wheeled vehicle.

FIG. 4B shows a configuration of a three-unit embodiment of friction drive system 100 in which second mounting mechanism 130 may be disposed on battery unit 102 for coupling with second mount 211 on wheeled vehicle 200. In this embodiment, control unit 101 and drive assembly 103 may be attached together and independently mounted via mount 121. Line 131 may provide power (e.g., as a two-conductor DC signal) from battery unit 102 to control unit 101 (or directly to drive assembly 103). Line 131 may be detachable (e.g., via barrel, coaxial, USB or other electrical connection) from battery unit 102 and/or control unit 101. Battery unit 102 also may exchange information with control unit 101 via signals transmitted over line 131, such as information about battery state provided by a Battery Management System ("BMS"). Alternatively, battery state information may be provided wirelessly using Bluetooth, IEEE 802.11, or other suitable wireless technology.

The embodiment of FIG. 4B may provide the advantage of mounting battery unit 102 separately to the frame of the bicycle, thereby reducing the weight of the portion of friction drive system 100 that is disposed adjacent to the wheel (e.g., above the wheel in some embodiments). Reducing the weight mounted adjacent to the wheel may, for example, provide for smoother steering and enhanced stability. In addition, mounting battery unit 102 separately on the body of wheeled vehicle 200 may reduce strain on mounting mechanism 121 and reduce the impact of any vibrations. In still other embodiments of the disclosure (as shown in FIG. 4E), control unit 101 may be mounted together with battery unit 102 on the body of wheeled vehicle 200, further reducing the weight of the system mounted adjacent to the wheel.

Figure 4C:
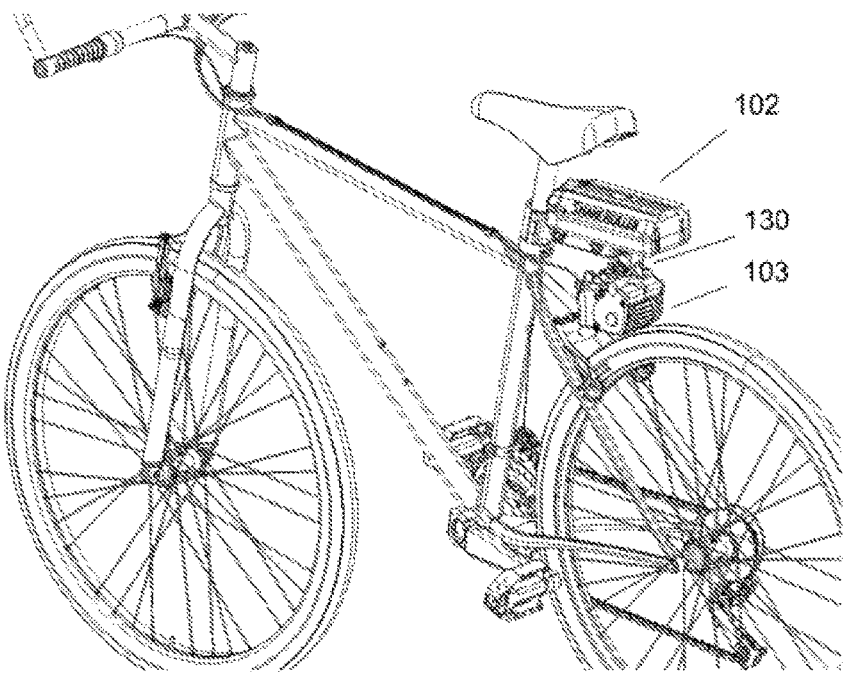
FIG. 4C shows an example of a three-unit embodiment of a friction drive system in which a control unit, a battery unit, and a drive assembly are mounted adjacent to a rear wheel of a wheeled vehicle

FIG. 4C shows yet another configuration of a three-unit embodiment of friction drive system 100 in which control unit 101, battery unit 102, and drive assembly 103 may be attached together and mounted to the frame of a bicycle (or other wheeled vehicle); however, unlike in FIG. 4A, in this embodiment the three units are connected together and mounted adjacent to a rear wheel of wheeled vehicle 200, depicted as a bicycle in this example.

Figure 4D:
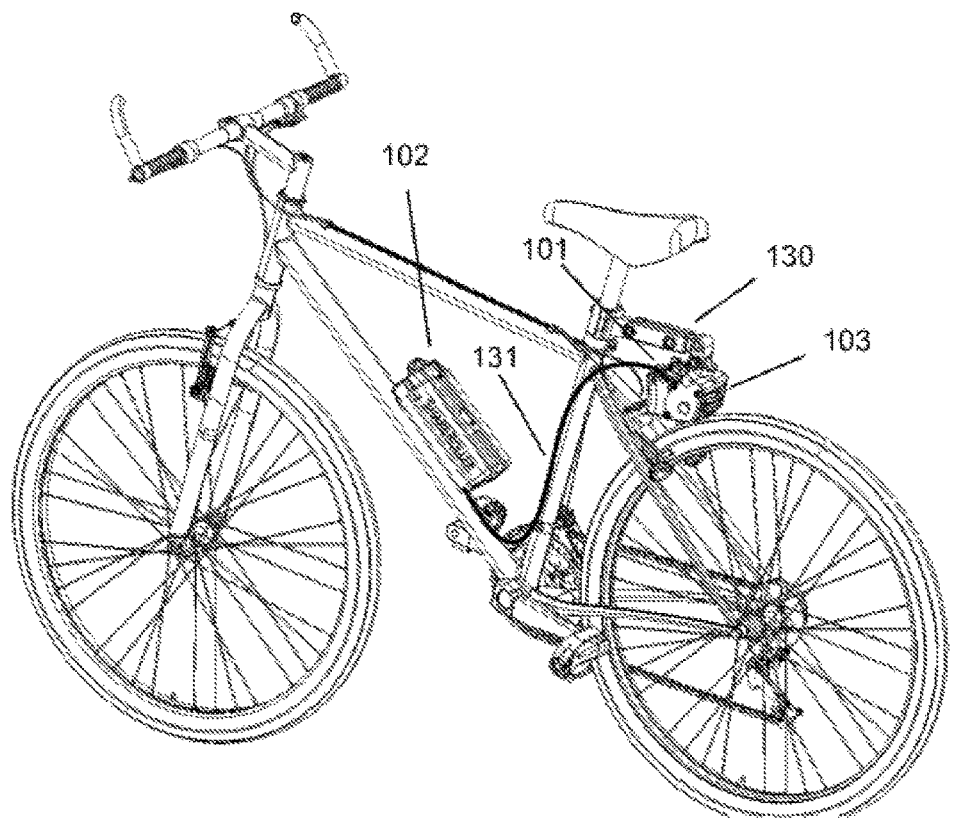
FIG. 4D shows an example of a three-unit embodiment of a friction drive system in which a control unit and a drive assembly are attached together and mounted adjacent to a rear wheel of a wheeled vehicle, and a battery pack is mounted to a frame of the wheeled vehicle.

FIG. 4D shows still another configuration of a three-unit embodiment of friction drive system 100 in which control unit 101 and drive assembly 103 may be attached together and mounted above a rear wheel of wheeled vehicle 200. As shown in FIG. 4D, battery unit 102 may be mounted separately onto the frame of wheeled vehicle 200. As described in reference to FIG. 4B, line 131 may provide power (e.g., as a DC signal) from battery unit 102 to control unit 101 (or directly to drive assembly 103).

Figure 4E:
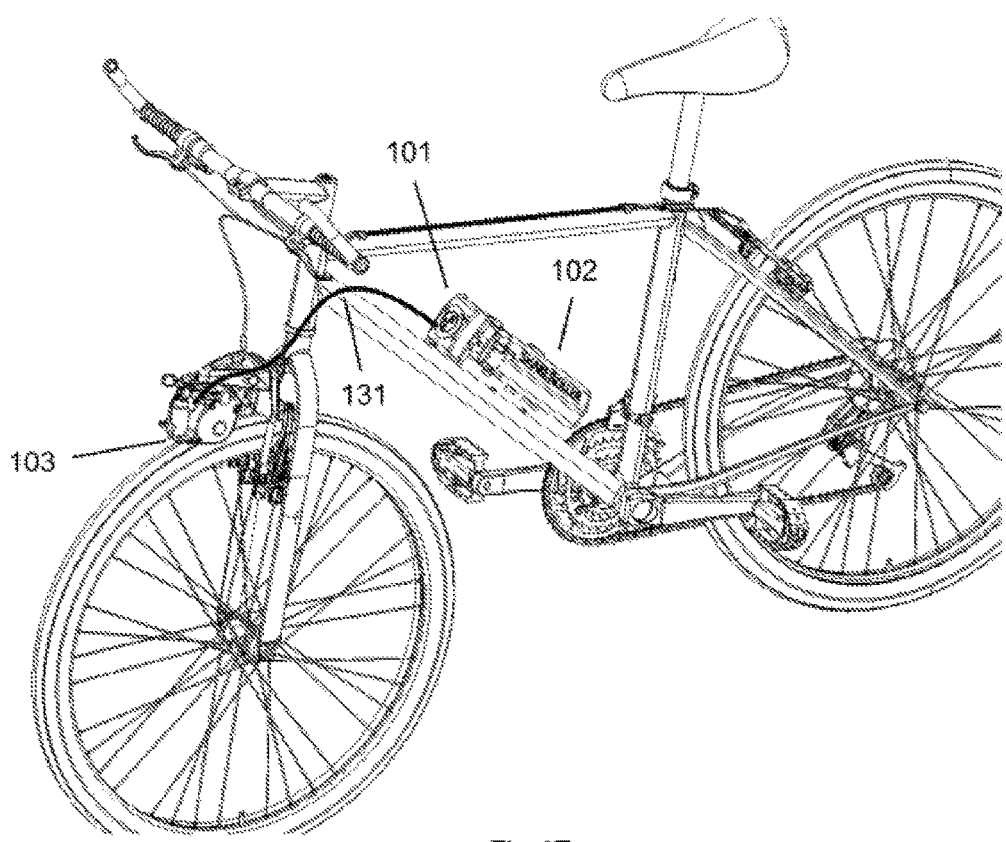
FIG. 4E shows an example of a three-unit embodiment of a friction drive system in which a drive assembly is mounted adjacent to a front wheel of a wheeled vehicle; and a battery pack and a control unit are attached together and mounted to a frame of the wheeled vehicle.

FIG. 4E shows a further configuration of a three-unit embodiment of friction drive system 100 in which drive assembly 103 may be mounted by itself above a front wheel of wheeled vehicle 200. As show in FIG. 4E, battery unit 102 and control unit 101 may be attached together and mounted to the frame of the bicycle. In this embodiment, line 131 may carry a three phase power signal from BLDC 106, and line 131 also may carry one or more signals for controlling drive assembly 103.

A person of skill in the art, in view of the present disclosure, would understand that drive assembly 103 could also be mounted by itself above a rear wheel of wheeled vehicle 200; furthermore, drive assembly 103 could be modified (or replaced) to act as a hub motor, mid-drive, or other motorized system for delivering power to a wheeled vehicle.

In FIGS. 4A to 4E, drive assembly 103 may include motor mount assembly 140 for attaching to mount 210 in a position adjacent to the front or rear wheel of the bicycle (or other wheeled vehicle). In some embodiments, motor mount assembly 140 may include triangular receptacle 122 and sliding plunger mechanism 123 for coupling with a bike share bicycle; alternatively, motor mount assembly 140 may be adapted to couple with other types of mounts and/or vehicles. Notably, the three units of friction drive system 100 may be designed such that they can be attached in any of the configurations of FIGS. 4A to 4D, as desired by the end-user, and/or in other configurations not shown.

Figure 4F:
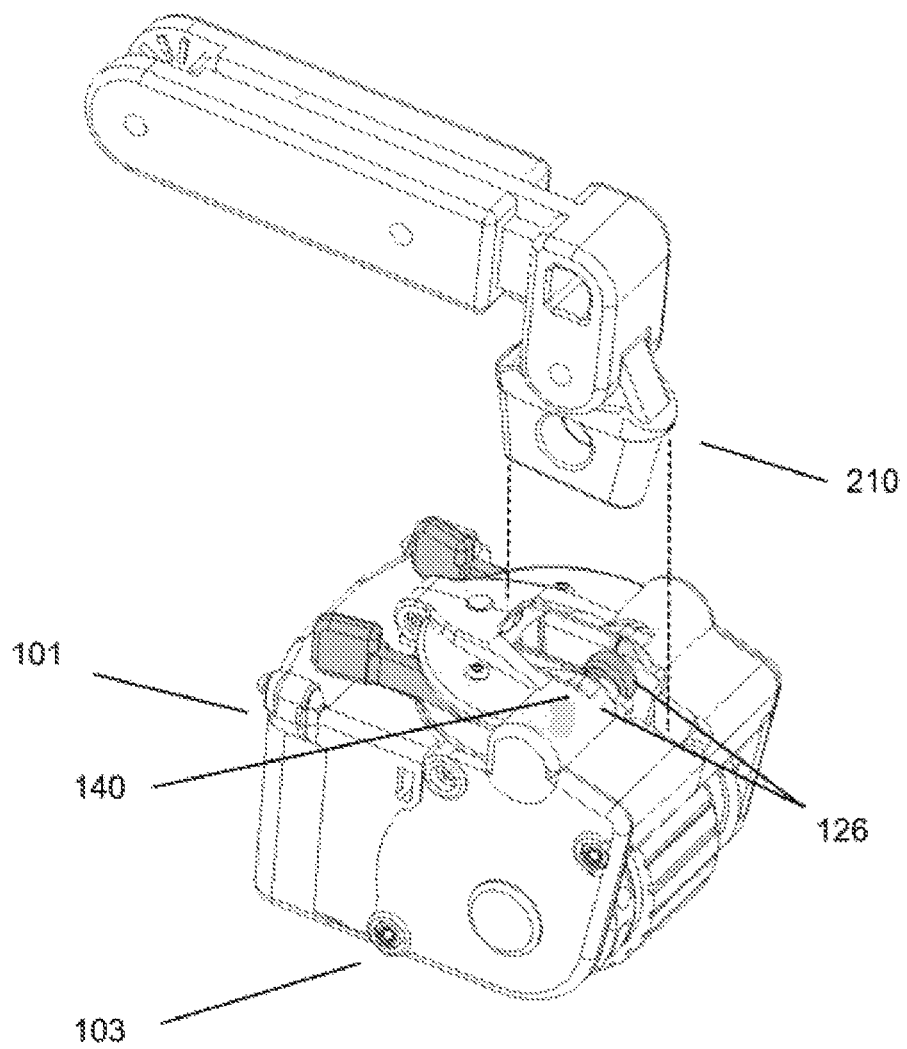
FIG. 4F shows an example of a control unit coupled to a drive assembly, where the drive assembly includes a motor mount assembly capable of coupling with a mount.

FIG. 4F shows an example of motor mount assembly 140 which is capable of coupling with mount 210. As shown in FIG. 4F, control unit 101 may attach to drive assembly 103, which may include motor mount assembly 140. Motor mount assembly 140 may include a groove and dual-pistons 126 for securely coupling with mount 210; alternatively, one or more sliding plunger mechanisms (or other coupling mechanisms) may be used instead of dual-pistons 126. Mount 210 may, for example, be attached to wheeled vehicle 200 adjacent to a front or rear wheel, such that drive assembly 103 may deliver power to the wheel when securely coupled to mount 210.

Embodiments of friction drive system 100 having a three-unit design, as exemplified in FIGS. 4A-F, may be highly configurable and adaptable to different vehicles, which may have different mounting requirements. The three-unit design may provide greater flexibility and may significantly reduce costs to the user, as compared to other designs, because different units may be used interchangeably depending on the vehicle type and desired setup. For example, battery unit 102 may easily be replaced with a fresh battery when the charge runs low or upgraded to provide more capacity, power, etc., without replacing the other units. As another example, different sized batteries may be used with different vehicles (e.g., a smaller battery with a scooter as compared to a bicycle) without replacing the other units. As yet another example, the same battery unit 102 and control unit 101 may be used with different drive assemblies 103 designed for use with different types of vehicles and/or designed to power a vehicle in different manners. For example, some drive assemblies may be designed to power a bicycle, while others may be designed to power a scooter; some drive assemblies may power the front wheel, others may power the rear wheel, still others may power the hub of the front or rear wheel, and yet others may power the crank or pedal assembly. The three-unit design makes it possible to use the same battery and controller with various custom drive assemblies. In a similar manner, different control units 101 may be used with the same battery unit 102 and/or drive assembly 103. Thus, embodiments of the disclosure having a three-unit design may provide a great deal of flexibility to the manufacturer, retailer, and end user by allowing components to be used interchangeably.

Figure 5A:
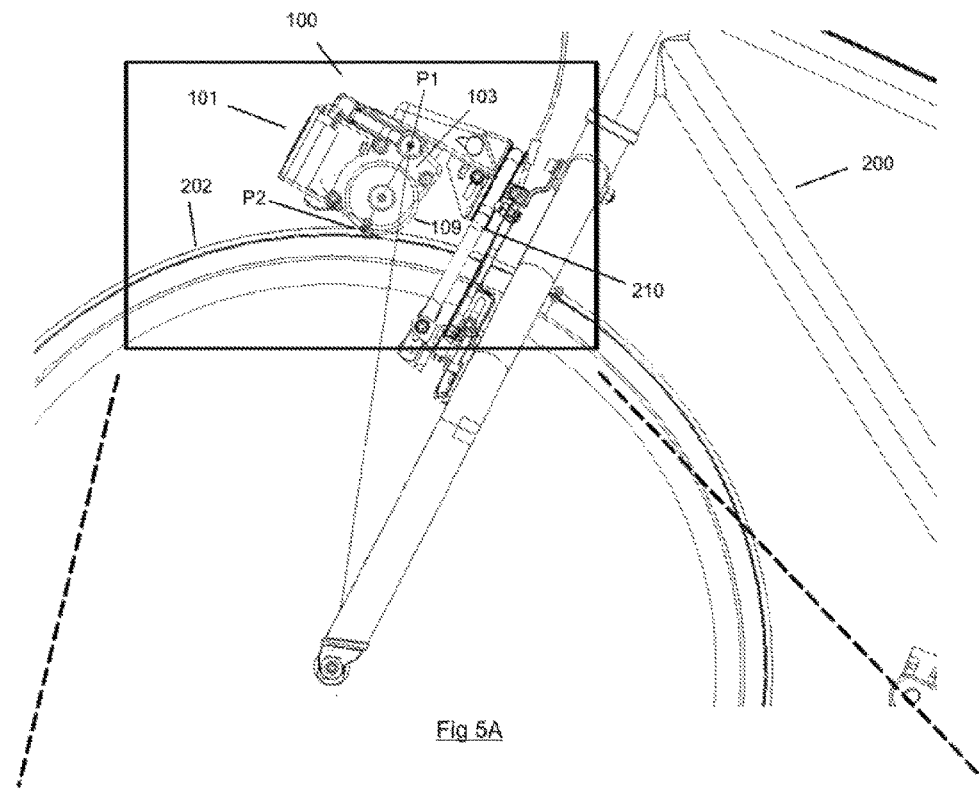
FIG. 5A shows an embodiment of a friction drive system wherein a control unit and a drive assembly are mounted to a mount adjacent to a front wheel of a wheeled vehicle such that a contact surface is engaged with the tire; and the drive assembly is capable of pivoting relative to the mount.
Figure 5B:
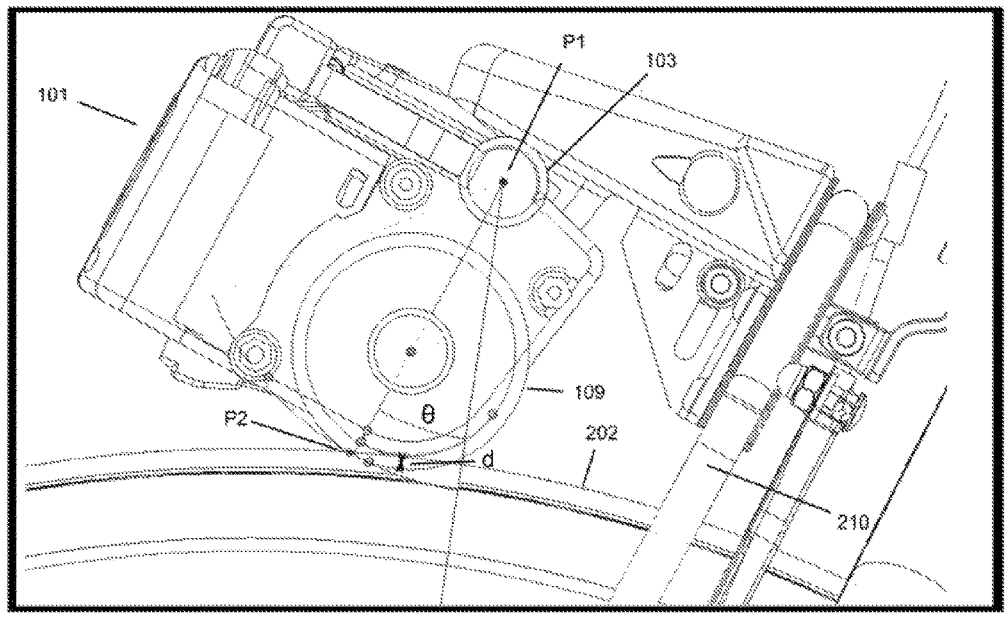
FIG. 5B shows a close-up of the boxed region in FIG. 5A.

FIGS. 5A and 5B show an embodiment of friction drive system 100 wherein control unit 101 and drive assembly 103 are mounted to mount 210 on wheeled vehicle 200. FIG. 5B shows a close-up view of the boxed region in FIG. 5A. As shown in FIGS. 5A and 5B, in embodiments of the disclosure the amount of normal force between contact surface 109 and tire 202 may be determined, at least in part, by distance d which contact surface 109 presses into tire 202. An angle $\theta$ may be defined as the angle between the center of wheel 201 and pivot point P1 of drive assembly 103 relative to the line from P1 through the center of drive motor 104. Decreasing angle $\theta$ towards 0 degrees increases distance d and the amount of normal force, $F_N$. As previously explained, the amount of friction is proportional to the normal force (for a given coefficient of friction, $\mu$). Therefore, in some embodiments, the amount of friction may be controlled through angle $\theta$. The distance between P1 and P2, where P2 is the intersection of the outer edge of contact surface 109 with the line from P1 through the center of drive motor 104, determines how much angle $\theta$ must vary to increase distance d by a given amount at a given position of angle $\theta$. As one of skill in the art would understand in view of the present disclosure, the amount of change in distance d (and thus the normal force) for a given change in angle $\theta$ may be controlled by changing the relative proportions of the friction drive system, as a matter of design choice.

In view of the present disclosure, one of skill in the art would understand that in other embodiments of the disclosure, depending on design choice and how angle $\theta$ is defined, increasing angle $\theta$ may increase distance d and the normal force and, conversely, decreasing angle $\theta$ may decrease distance d and the normal force.

Figure 6:
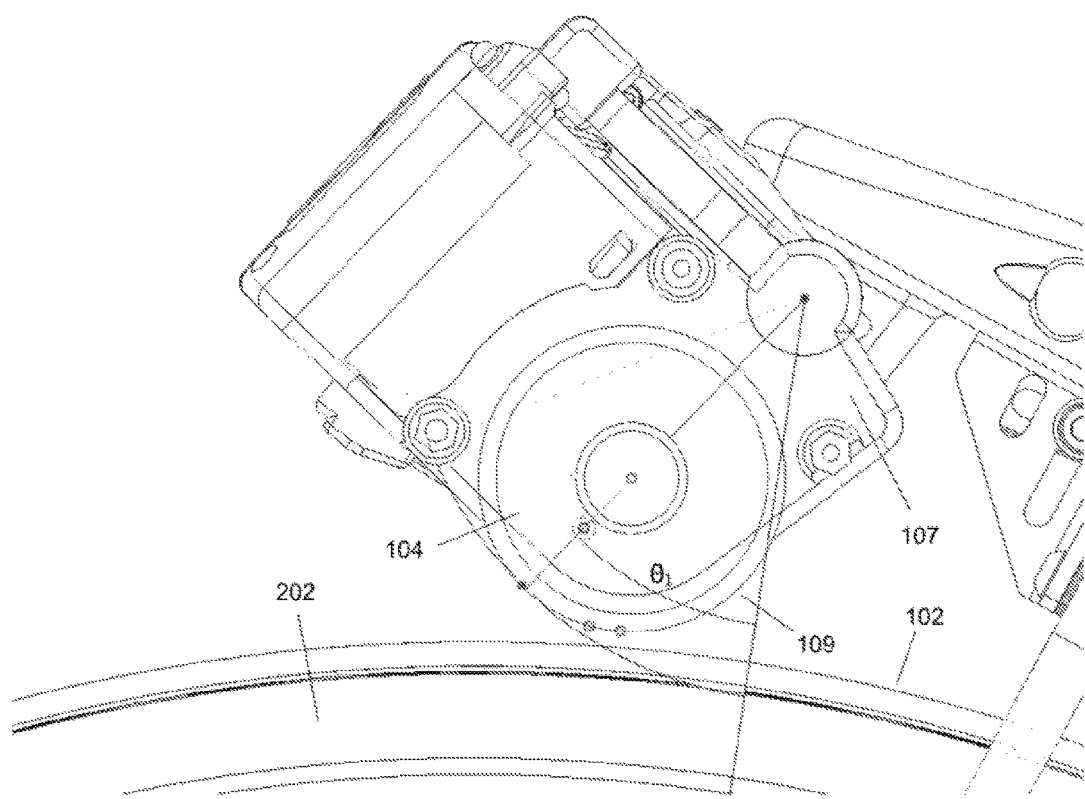
FIG. 6 shows an embodiment of a drive assembly where an angle of a pivoting mechanism initially is set to a disengaged position relative to a tire, but the pivoting mechanism may swing into an engaged position using motor torque or by a secondary motorized pivot control mechanism.

In some embodiments, contact surface 109 of drive assembly 103 may always be engaged with tire 202. In alternative embodiments, as illustrated in FIG. 6, contact surface 109 may engage and disengage with tire 202 on-demand. As shown in FIG. 6, starting value $\theta_1$ of angle $\theta$ may be set such that contact surface 109 is disengaged from tire 102 when motor 104 is not running. When powered, motor 104 generates torque that may pull pivot arm 107 into tire 202. A biasing force (e.g., from a spring mechanism, not shown) may return pivot arm 107 to its starting position when motor 104 is unpowered. Thus, embodiments of the disclosure may automatically engage and/or disengage contact surface 109 with tire 202 using torque from motor 104, thereby eliminating drag on the system and preventing wear when motor 104 is not in use.

Figure 7:
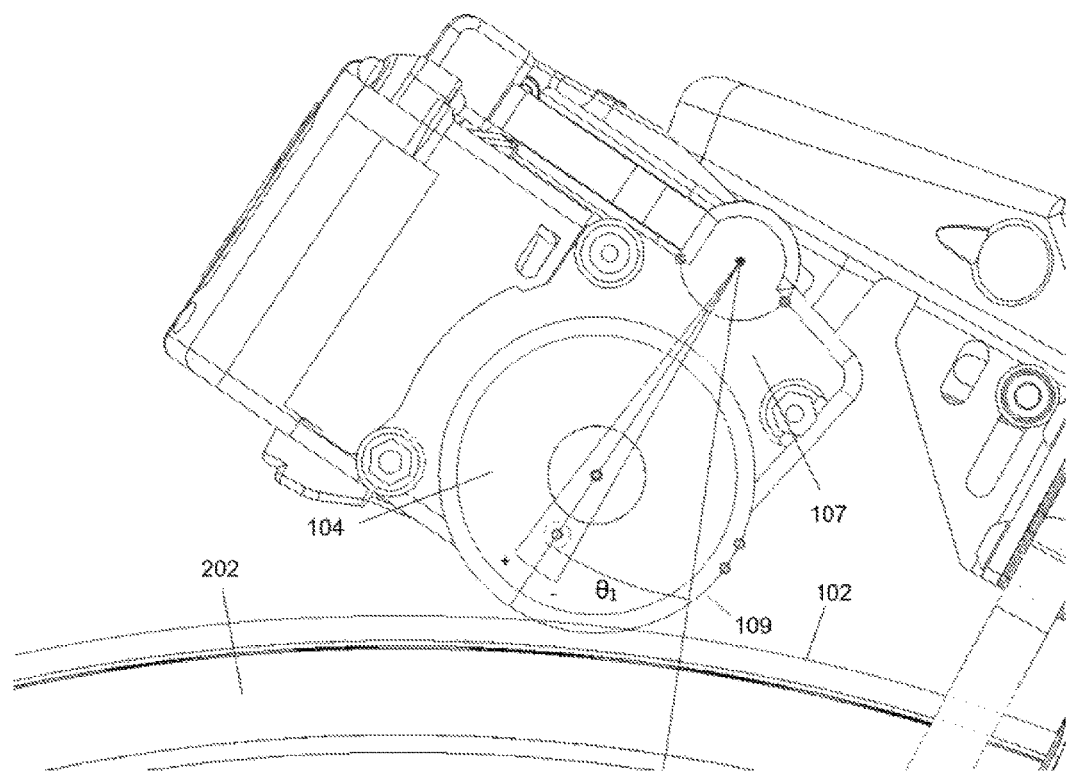
FIG. 7 shows an embodiment of a drive assembly with a pivoting mechanism that has a freedom of angular motion about an initial angle which may be controlled.

FIG. 7 shows an embodiment where starting value $\theta_1$ is set to engage contact surface 109 with tire 202 and to provide enough friction to power wheel 201 during normal conditions (e.g., not raining, dry pavement, etc.). Value $\theta_1$ may be preset, determined through calibration, set when mount 210 is installed, and/or set when drive assembly 103 is coupled to mount 210. In the embodiment of FIG. 7, angle $\theta$ may vary about $\theta_1$ by a predetermined amount, which may be from 3° to 5° in some embodiments. As shown in FIG. 7, when angle $\theta$ is decreased by a predetermined amount from $\theta_1$ (indicated by the "−" sign) the normal force and the amount of friction may increase, thereby preventing slippage between contact surface 109 and tire 202 in wet or slippery conditions, for example. On the other hand, when angle $\theta$ is increased by a predetermined amount (indicated by the "+" sign), contact surface 109 may completely lose contact with tire 102. For example, it may be desirable to disengage contact surface 109 from tire 202 when motor 104 is not providing power in order to prevent drag on wheel 201, which could slow vehicle 200. Disengaging contact surface 109 from tire 202 also may prevent wear to tire 202 and motor drive assembly 103.

In embodiments of the disclosure, angle $\theta$ may vary freely within a limited range about initial value $\theta_1$. The value of $\theta_1$ itself may be varied in a controlled manner—either manually or automatically—depending on road conditions, weather, and the like. When angle $\theta$ is free to vary within a few degrees about $\theta_1$, torque from motor 104 may act to automatically adjust the amount of friction as needed. For example, when torque from motor 104 increases in response to a user pressing the throttle, this may cause a pivoting mechanism to swing downwards, pressing contact surface 109 into tire 202 and increasing the amount of friction. Conversely, when torque from motor 104 decreases, rotation of the wheel may push contact surface 109 away from tire 202, thereby reducing the amount of friction. Advantageously, this automatic adjustment in friction may occur without the need for intervention by the user and without requiring a specific control algorithm. Nonetheless, it may still be desirable to change the value of $\theta_1$ in a controlled manner depending on road conditions, weather, and the like, because the freedom of motion about $\theta_1$ may provide only a limited amount of automatic adjustment.

In embodiments of the disclosure, angle $\theta$ may be allowed to vary freely within about plus or minus 3° of $\theta$, and the value of $\theta_1$ may itself be adjustable within about plus or minus 15°. Allowing $\theta_1$ to be adjusted may provide greater ability to customize the configuration for a particular wheeled vehicle or for particular road and/or weather conditions. In other embodiments of the disclosure, angle $\theta$ may not be allowed to vary freely and may be constrained to the value of 01. Nonetheless, the value of $\theta_1$ itself may still be varied in a controlled manner, either manually or automatically. Constraining the value of angle $\theta$ to equal $\theta_1$ may provide more precise control over the amount of friction in some embodiments of the disclosure. For example, in some embodiments, Automatic Traction Control System 150 may determine the precise value of angle $\theta_1$ for optimal performance.

Figure 8A:
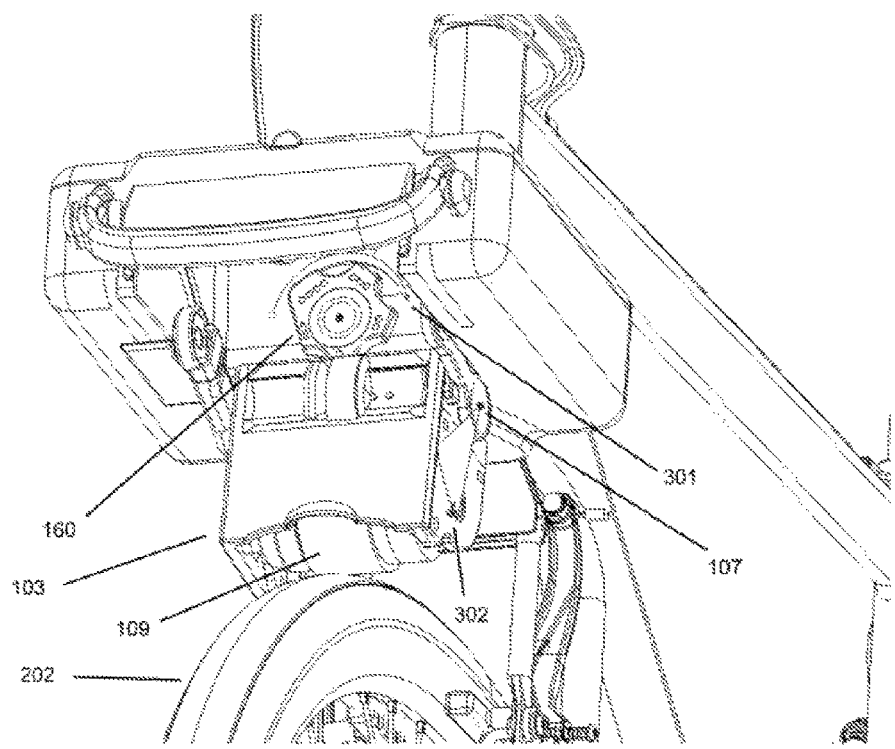
FIG. 8A shows a front view of an embodiment of a drive assembly having adjustable knobs for controlling a range of angular motion of a pivoting mechanism.
Figure 8B:
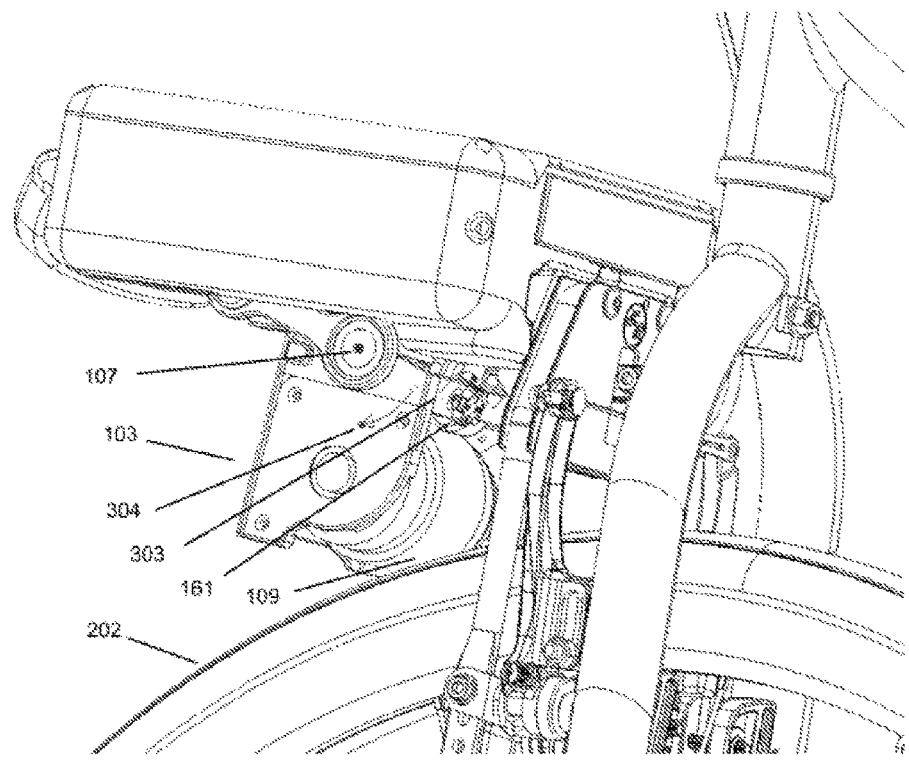
FIG. 8B shows a side view of an embodiment of a drive assembly having adjustable knobs for controlling a range of angular motion of a pivoting mechanism.

FIGS. 8A and 8B show an embodiment of friction drive system 100 having a unitary design, wherein the allowed variation of angle $\theta$ may be controlled by adjustment knobs 160 and 161. As illustrated in FIG. 8A, adjustment knob 160 maybe used to control the maximum value of angle $\theta$, thereby limiting the minimum amount of friction between contact surface 109 and tire 202. Turning adjustment knob 160 in the direction of arrow 301 may pivot motor assembly 103 inward toward tire 202 and/or prevent angle $\theta$ from exceeding a certain value, thereby increasing the minimum amount of friction that may be provided (e.g., a smaller angle $\theta$ corresponds to a greater amount of friction in this embodiment). Similarly, as illustrated in FIG. 8B, adjustment knob 161 may be used to control the minimum value of angle $\theta$, thereby limiting the maximum amount of friction between contact surface 109 and tire 202. Turning adjustment knob 161 in the direction of arrow 303 may pivot motor assembly 103 outward away from the tire and/or prevent angle $\theta$ from decreasing below a certain value, thereby reducing the maximum amount of friction that may be provided.

Knobs 160 and 161 may have various settings (e.g., five settings in FIG. 8A) which may physically limit the range of motion of pivot arm 107, thereby constraining angle $\theta$. Knobs 160 and 161 may be adjusted manually by a user, or automatically by stepper motors or the like (not shown) controlled by control unit 101. One of skill in the art, in view of the present disclosure, would understand that knobs 160 and 161 also be used with other embodiments and configurations of friction drive system 100 including with a three-unit embodiment as illustrated in FIGS. 4A-F.

Figure 9:
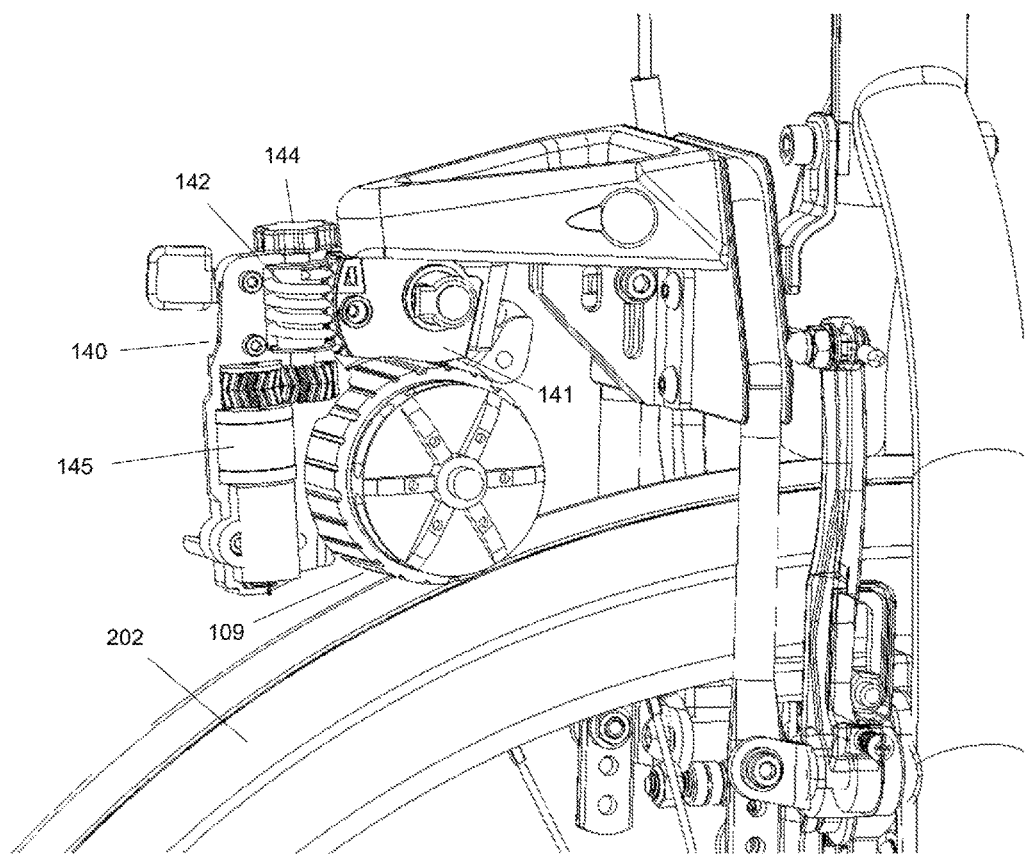
FIG. 9 shows an embodiment of a drive assembly having a worm gear for controlling an angle of a pivot bracket on the drive assembly and, thus, an amount of normal force between a contact surface on the drive assembly and a tire.

FIG. 9 shows an embodiment of drive assembly 103 having motor mount assembly 140 and pivot bracket 141. In this embodiment, pivot bracket 141 may have a pre-set pivot range of about 30° (plus or minus 15° about a starting position) relative to motor mount assembly 140. As shown in FIG. 9, pivot bracket 141 may have a rounded circumference with teeth capable of engaging with worm gear 142. Worm gear 142 may be anchored to motor mount assembly 140 and control the value of angle $\theta_1$ (and/or a range of values of angle $\theta$ about $\theta_1$) between pivot bracket 141 and motor mount assembly 140. For example, turning worm gear 142 may rotate pivot bracket 141 relative to motor assembly 140, thereby changing angle $\theta_1$ and the resulting normal force between contact surface 109 and tire 202. Worm gear 142 may be rotated manually via knob 144 and/or automatically with gear motor 145. In some embodiments, gear motor 145 may be a stepper motor, a standard DC motor, or other motor capable of controlling worm gear 142. In some embodiments, both knob 144 for manual adjustment and gear motor 145 for automatic adjustment may be provided, thereby allowing a user to manually calibrate the system through knob 144 while also benefiting from automatic control during normal use. Furthermore, rather than knob 144, another control may be used to allow the user to manually adjust the normal force; for example, a slider or dial may be provided on friction drive system 100 or on throttle 115.

In embodiments where gear motor 145 is a standard DC motor, motor current draw may be proportional to normal force. Control unit 101 may determine (or estimate or lookup from a table) an amount of normal force by monitoring the motor current draw. Accordingly, in some embodiments, it may not be necessary to monitor the position of gear motor 145 and/or worm gear 142. It may be possible to determine when worm gear 142 is at its maximum position by detecting a rapid increase in motor current draw. Furthermore, by monitoring the speed (or RPM) of the drive motor, it may be possible to determine when contact surface 109 disengages from the tire.

In view of the present disclosure, a person of skill in the art would understand that other mechanisms may be used to control the amount of depression into the tire and, thus, the amount of normal force. For example, rather than a pivoting mechanism, another embodiment could employ a linear motion mechanism that would enable motor mount assembly 140 to move closer into tire 202 to increase normal force or away from tire 202 to decrease normal force. Such a linear motion mechanism could be controlled and adjusted manually by the user or electromechanically by means of a linear actuator or similar.

In some embodiments, multiple traction modes may be established for different road and/or weather conditions. For example, multiple traction modes may be provided in order of increasing (or decreasing) normal force. A user may have the ability to select between two (or more) modes, one mode for dry conditions and another mode for wet conditions, a third (or even a fourth) mode may be provided for extremely slippery conditions. Changing the traction mode (e.g., from "dry" to "wet") may decrease the value of angle $\theta_1$ by a predetermined amount (e.g., by 5°) and thereby increase the normal force (and the amount of friction). In embodiments of the disclosure, a user may select a traction mode by adjusting a knob disposed on drive assembly 103. Alternatively (or in addition), a user may select a traction mode through a button (or other interface) disposed on a throttle mechanism or external controller, or a user may select a traction mode through an application running on their smartphone or other electronic device.

In still other embodiments of the disclosure, an Automatic Traction Control System may adjust the value of angle $\theta_1$ in response to sensed conditions, without requiring user selection of a traction mode. As shown in FIG. 1B, in some embodiments, control unit 101 may include Automatic Traction Control System ("ATCS") 150. ATCS 150 may be implemented as software or firmware instructions executing on a processor within control unit 101, or as stand-alone circuitry. Alternatively, ATCS 150 may be provided within drive assembly 103, battery unit 102, or separately.

Automatic Traction Control System 150 may continuously vary the normal force for optimal system performance, maintaining sufficient friction between contact surface 109 and tire 102 to prevent slippage, while also improving battery efficiency and reducing wear on tire 202. For example, ATCS 150 may quickly increase the normal force when slippage is detected, until traction is regained between contact surface 109 and tire 202. ATCS 150 also may quickly reduce the normal force to maximize battery efficiency. And ATCS 150 may completely disengage contact surface 109 from tire 102 when motor 104 is not providing power to eliminate drag.

Automatic Traction Control System 150 may be particularly advantageous when used with the embodiment shown in FIG. 9, because worm gear 142 may provide fine control over angle $\theta_1$ and the resulting normal force, as well as significant mechanical advantages enabling high normal forces to be applied with minimal physical effort. Moreover, knob 144 may allow the user to manually calibrate ATCS 150 to provide more or less force, depending on the particular configuration and desired system performance.

In embodiments of the disclosure, Automatic Traction Control System 150 may automatically increase the normal force (e.g., by decreasing angle $\theta_1$) when slippage is detected. Slippage may be detected in a number of ways. For example, in embodiments of the disclosure, slippage may be detected by comparing the speed of tire 202 (and/or wheel 201) to the speed of contact surface 109. If the surface of tire 202 is moving at a different speed than contact surface 109 while the two are supposed to be in contact, then Automatic Traction Control System 150 may determine that slippage exists. In some embodiments, the speed of tire 202 may be calculated from the rotational speed of wheel 201; and the speed of contact surface 109 may be calculated from the rotational speed (or RPMs) of motor 104. Similarly, angular speeds (and/or other parameters) may be compared to detect slippage using known physical relationships.

In embodiments of the disclosure, a wheel speed sensor may sense the speed of wheel 201 (and/or tire 202). For example, a sensor wheel disposed on drive assembly 103 may continuously contact wheel 201 (and/or tire 202) to detect the speed of wheel 201, which may be directly proportional to the speed of the unpowered sensor wheel. As another example, a sensor disposed on wheeled vehicle 200 and/or wheel 201 may detect the wheel speed and send information wirelessly (e.g., using Bluetooth) or over a wired connection to control unit 101 and/or traction control system 150. In view of the present disclosure, a person of skill in the art would understand that wheel speed may be sensed and/or measured in various ways using sensors known in the art, such as OTS magnetic wheel speed sensors.

In still other embodiments of the disclosure, an optical sensor may be used to measure the ground speed, the ground speed may then be compared to the speed of motor 104 to determine whether slippage exists (e.g., using known relationships between speeds). Alternatively, a high-accuracy GPS sensor may be used to calculate the ground speed, rather than detecting the ground speed directly. The GPS sensor may be provided in an attached (or synchronized) smartphone or other device or within friction drive system 100.

In yet other embodiments of the disclosure, a pressure sensor (and/or angular position sensor) may be disposed within pivot bracket 141 (and/or pivot arm 107) to determine the pressure with which contact surface 109 presses into tire 202, using known relationships between forces. During normal operation, when electrical power is supplied to motor 104, contact surface 109 should press into tire 202; moreover, rotation of motor 104 and the friction force may act to pull motor 104 towards the tire. The pressure between contact surface 109 and tire 202 may be detected (or inferred) by measuring a corresponding pressure between pivot bracket 141 and stopping surface 146. If electrical power is supplied to motor 104 and motor mount assembly 140 does not pull into tire 202 (thereby creating pressure between pivot bracket 141 and stopping surface 146), this may indicate that slippage is occurring. Thus, ATCS 150 may use the detected pressure (and/or angular position) together with motor current (and/or motor power or torque) to determine when slippage is occurring. Similarly, a pressure sensor disposed within motor mount assembly 140 could measure the pressure with which contact surface 109 presses into tire 202.

In still other embodiments of the disclosure, an actual motor current draw may be compared with a desired motor current draw to deduce when slippage exists. Desired motor current draw may be derived, at least in part, from a throttle input from the user indicating the desire to power wheeled vehicle 200. For example, the amount of desired current motor draw may be proportional to the amount of throttle depression, and the maximum throttle depression may correspond to a maximum current that may be drawn by motor 104, adjusted for motor RPM. Alternatively, a more complex relationship may exist between desired motor current draw and one or more input signals (including those described above), and this relationship may be provided in the form of a lookup table or calculated by ATCS 150 as needed. The calculation (or lookup) of desired motor current draw also may take into account various physical properties of motor 104, including variation in motor current draw with motor speed. Once an amount of desired motor current motor draw is determined, Automatic Traction Control System 150 and/or control unit 101 may attempt to deliver actual motor current equal to the amount of desired motor current. Then, actual motor current draw may be compared to the amount of desired motor current draw to determine if slippage exists. For example, if actual motor current draw falls below the amount of desired motor current draw by a certain amount, this may indicate that slippage exists, because motor 104 is not seeing a sufficient load.

In other embodiments, ATCS 150 may monitor the throttle level, RPMs of motor 104, current drawn by motor 104, and/or current drawn by gear motor 145 in order to initialize engagement between contact surface 109 and tire 202, detect when slippage exists, and/or automatically correct for slippage. The exemplary control algorithms shown in FIGS. 10-18 may be performed by ATCS 150 and/or control unit 101. FIGS. 10-18 are described below with respect to the embodiment of friction drive system 100 shown in FIG. 9, however, one of skill in the art in view of the present disclosure would understand how to modify the control algorithms of FIGS. 10-18 to work with other embodiments of a friction drive system, including other embodiments described herein. For example, as discussed above, other mechanisms may be used to control the amount of normal force rather than a worm gear and a pivot bracket.

Automatic Traction Control System 150 may initialize pressure between contact surface 109 and tire 202. Friction drive system 100 may be configured to start with contact surface 109 disengaged from tire 202. For example, referring to the embodiment of FIG. 9, worm gear 142 (controlled by gear motor 145) may return to a starting position whenever friction drive system 100 is powered down (or powered on). In the starting position, contact surface 109 may be positioned such that it does not engage with tire 202 when mounted to a wheeled vehicle. Advantageously, returning to the starting position whenever friction drive system 100 is powered down may facilitate rapid removal and installation of friction drive system 100 from wheeled vehicle 200. In some embodiments, worm gear 142 may retract off the tire whenever power from motor 104 is not required (or desired), such as when the throttle is released for a period of time.

Current drawn by gear motor 145 may be used as an indicator of how much normal force exists between contact surface 109 and tire 202—as the normal force increases, so does the current drawn by gear motor 145. Based on the direction in which worm gear 142 is advanced (e.g., in the forward direction), it may be possible to determine (or infer) when contact is made with tire 202 (or other surface to be driven). When contact surface 109 is disengaged from tire 202, gear motor 145 may draw very little current. Once contact surface 109 engages with tire 202, current drawn by gear motor 145 may rapidly increase. In some embodiments, current drawn by worm gear 145 may be proportional (or have another known relationship) to the amount of normal force between contact surface 109 and tire 202. Thus, the amount of normal force may be controlled by regulating the current drawn by gear motor 145. Advantageously, the control algorithms shown in FIGS. 10-18 may establish sufficient normal force to engage tire 202 regardless of the exact placement of friction drive system 100 relative to tire 202 and regardless of the amount of air pressure in tire 202, because worm gear 142 may continue advancing until the threshold level is reached (thereby indicating sufficient normal force).

Figure 10A:
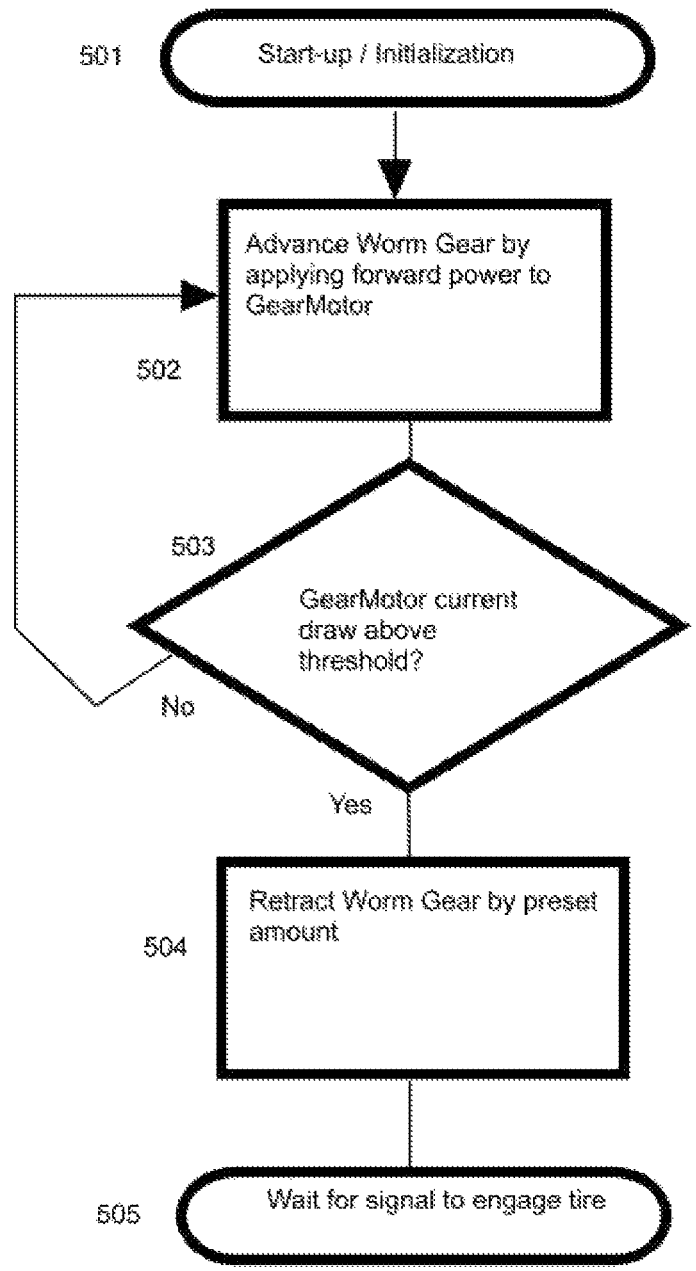
FIG. 10A shows an example of a flow chart for a start-up/initialization process for embodiments of a friction drive system

FIG. 10A shows an exemplary flow diagram for a start-up or initialization routine that may be used in embodiments of friction drive system 100, such as when starting with a throttle or Pedal Assist Sensor ("PAS"). In step 501, control unit 101 may initiate a start-up sequence when friction drive system 100 is turned on (e.g., by a switch or other mechanism) or in response to another indication. The start-up sequence also may be selected based on the mode, such as throttle mode or PAS mode, for example. In step 502, worm gear 142 may be advanced by applying forward power to gear motor 145. Control unit 101 may monitor current drawn by gear motor 145 and, in step 503, may determine when the current draw exceeds a threshold value. If the current drawn by gear motor 145 is below the threshold, then the flow may return to step 502 and worm gear 142 may be advanced further. If the current drawn by gear motor 145 is above the threshold, then the flow may proceed to step 504 and worm gear 142 may be retracted by a preset amount, for example, by applying reverse power to gear motor 145 for a period of time or for a predetermined number of increments. The preset amount may be set such that contact surface 109 is positioned slightly off of tire 202 but can easily be engaged by advancing worm gear 142. In step 505, control unit 101 may wait for a signal to engage the tire, such as a signal from the throttle or PAS.

In step 502 of FIG. 10A, control system 101 may vary the amount of advancement of worm gear 142 with the amount of current drawn by gear motor 145; for example, the amount of advancement may decrease as the amount of current drawn increases, in order to rapidly approach the threshold level. In this way, worm gear 142 initially may advance quickly to engage the tire and then more slowly as the tire is engaged and the threshold level is approached. This approach may be used throughout. FIGS. 10-17 whenever advancing worm gear 142 towards a position of engagement.

Figure 10B:
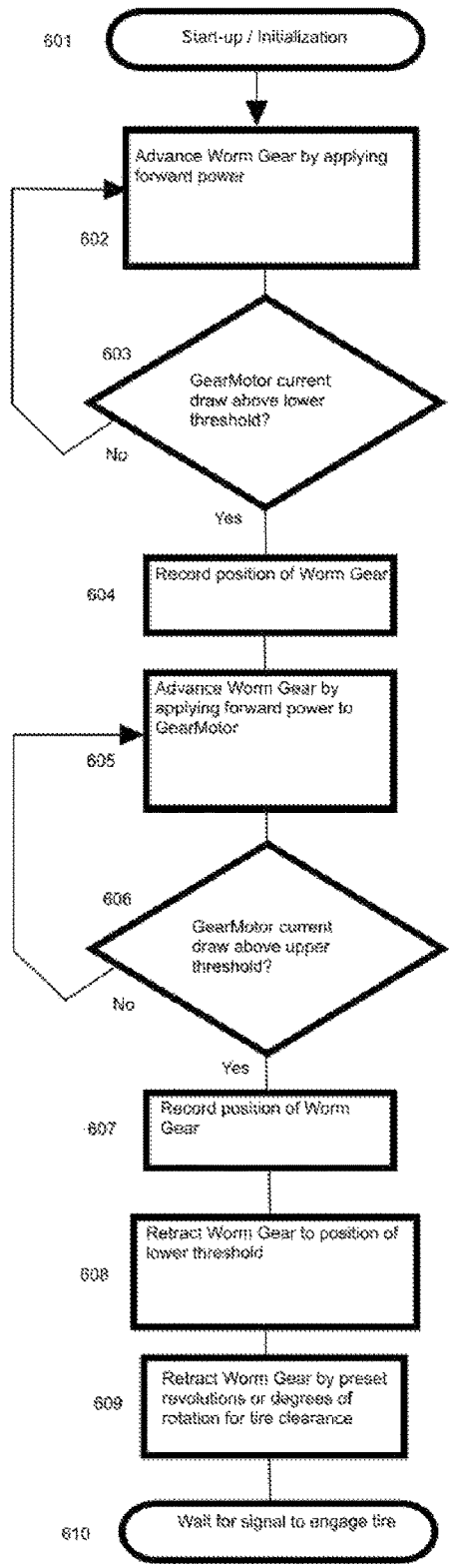
FIG. 10B shows another example of a flow chart for a start-up/initialization process for embodiments of a friction drive system.

FIG. 10B shows another example of a flow diagram for a start-up or initialization routine that may be used in embodiments of friction drive system 100, such as when starting with a throttle or Pedal Assist Sensor ("PAS"). In step 601, control unit 101 may initiate a start-up sequence when friction drive system 100 is turned on (e.g., by a power switch or other mechanism) or in response to another indication. The start-up sequence also may be selected based on the mode, such as throttle mode or PAS mode, for example in step 602, worm gear 142 may be advanced by applying forward power to gear motor 145. Control unit 101 may monitor current drawn by gear motor 145 and, in step 603, may determine when the current draw exceeds a lower threshold value. If the current drawn by gear motor 145 is below the lower threshold, then the flow may return to step 602 and worm gear 142 may be advanced further. If the current drawn by gear motor 145 is above the lower threshold, then the flow may proceed to step 604 and the position of worm gear 142 may be recorded by control unit 101 and stored in memory. For example, the position of worm gear 142 may be recorded as an angular position, a number of revolutions, a number of increments, a time period, or other measurement that allows the position to be identified and repeated. In step 605, worm gear 142 may be advanced by applying forward power to gear motor 145. In step 606, control unit 101 may determine if the current drawn by gear motor 145 exceeds an upper threshold. If the upper threshold is not exceeded, then worm gear 142 may return step 605 and further advance worm gear 142. If the upper threshold is exceeded, then the flow may proceed to step 607 and the position of worm gear 142 may again be recorded by control unit 101 and stored in memory. In step 608, worm gear 142 may be retracted to the position corresponding to the lower threshold by applying reverse power to gear motor 145 until the position is reached. The position corresponding to the lower threshold may, for example, be a position of minimum engagement between contact surface 109 and tire 202. In step 609, worm gear 142 may be retracted by an additional preset amount in order to disengage from tire 202. In step 610, control unit 101 may wait for a signal to engage the tire, such as a signal from the throttle or PAS.

Figure 11:
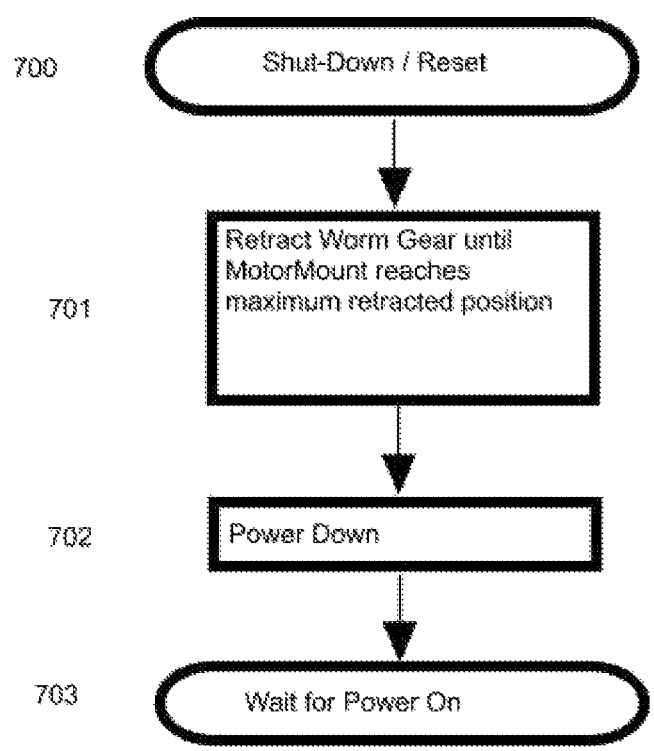
FIG. 11 shows an example of a flow chart for a shut-down/reset procedure for embodiments of a friction drive system

FIG. 11 shows an example of a flow diagram for a shut-down or reset routine that may be used in embodiments of friction drive system 100. In step 700, control unit 101 may wait for a signal to shut-down or reset, such as turning off a power switch or other indication. In step 701, worm gear 142 may be retracted by applying reverse power to gear motor 145 until a position of maximum retraction has been reached. A position of maximum retraction may be determined, for example, by monitoring a current drawn by gear motor 145. When the position of maximum retraction in the reverse direction is reached (e.g., when pivot bracket 141 cannot physically move further) the current drawn by gear motor 145 may spike and be detected by control unit 101. In step 702, control unit 101 may power down friction drive system 100. In step 703, control unit 101 may wait for a power-on indication.

Embodiments of friction drive system 100 may include a "Tailwind" mode that simulates the effect of tailwind by providing constant power output to drive motor 104 when contact surface 109 is engaged with tire 202. For example, Tailwind mode may be initiated once the wheeled vehicle reaches a certain minimum speed.

Figure 12A:
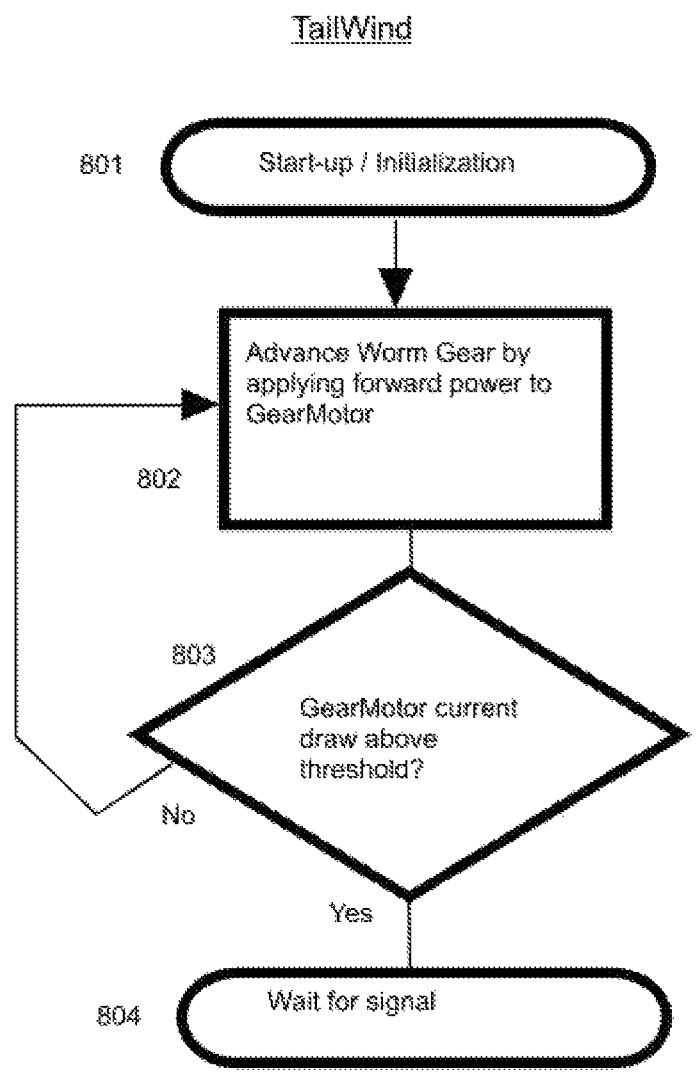
FIG. 12A shows an example of a flow chart for a start-up/initialization process for embodiments of a friction drive system when in a Tailwind mode.

FIG. 12A shows an example of a flow diagram for a start-up or initialization routine that may be used in Tailwind mode in embodiments of friction drive system 100. In step 801, control unit 101 may initiate a start-up sequence when friction drive system 100 is turned on (e.g., by a switch or other mechanism) or in response to another indication, such as switching to Tailwind mode. In step 802, worm gear 142 may be advanced by applying forward power to gear motor 145. Control unit 101 may monitor current drawn by gear motor 145 and, in step 803, may determine when the current draw exceeds a threshold value. If the current drawn by gear motor 145 is below the threshold, then the flow may return to step 802 and worm gear 142 may be advanced further. If the current drawn by gear motor 145 is above the threshold, then the flow may proceed to step 804 and wait for a signal. For example, control unit 101 may wait for a signal that a certain speed has been reached and then drive motor 104 may begin delivering power in Tailwind mode. Notably, contact surface 109 may remain engaged with tire 202 in step 804.

Figure 12B:
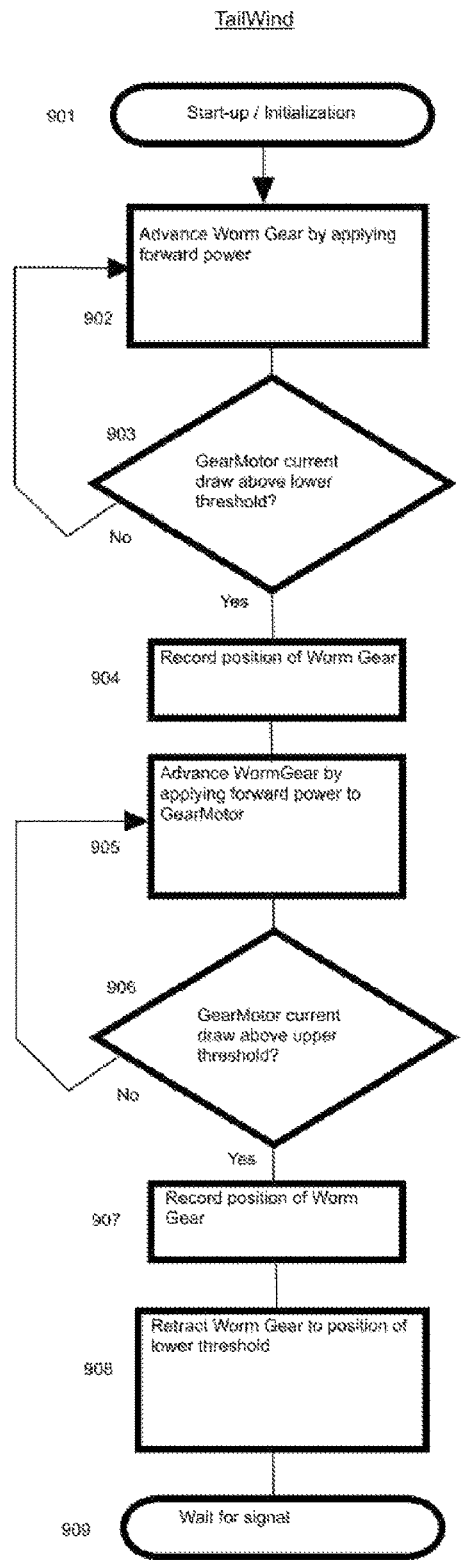
FIG. 12B shows another example of a flow chart for a start-up/initialization process for embodiments of a friction drive system when in a Tailwind mode.

FIG. 12B shows another example of a flow diagram for a start-up or initialization routine that may be used in Tailwind mode in embodiments of friction drive system 100. In step 901, control unit 101 may initiate a start-up sequence when friction drive system 100 is turned on (e.g., by a power switch or other mechanism) or in response to another indication, such as switching to Tailwind mode. In step 902, worm gear 142 may be advanced by applying forward power to gear motor 145. Control unit 101 may monitor current drawn by gear motor 145 and, in step 903, may determine when the current draw exceeds a lower threshold value. If the current drawn by gear motor 145 is below the lower threshold, then the flow may return to step 902 and worm gear 142 may be advanced further. If the current drawn by gear motor 145 is above the lower threshold, then the flow may proceed to step 904 and the position of worm gear 142 may be recorded by control unit 101 and stored in memory. In step 905, worm gear 142 may be advanced by applying forward power to gear motor 145. In step 906, control unit 101 may determine if the current drawn by gear motor 145 exceeds an upper threshold. If the upper threshold is not exceeded, then worm gear 142 may return step 905 and further advance worm gear 142. If the upper threshold is exceeded, then the flow may proceed to step 907 and the position of worm gear 142 may again be recorded by control unit 101 and stored in memory. In step 908, worm gear 142 may be retracted to the position corresponding to the lower threshold by applying reverse power to gear motor 145 until the position is reached. In step 909, control unit 101 may wait for a signal. For example, control unit 101 may wait for a signal that a certain speed has been reached and then drive motor 104 may begin delivering power in Tailwind mode. Notably, contact surface 109 may remain engaged with tire 202 in step 909.

In embodiments of the disclosure, the actual current draw of drive motor 104, the RPMs of drive motor 104, and the throttle input level may be monitored at regular intervals (or continuously), and between about 1 to 2 seconds of the most recent data may be stored in memory on a rolling basis. ATCS 150 may use the throttle input level to lookup (or calculate) a desired motor RPM value. For example, in some embodiments, the lookup table may be set such that the throttle input level as a percentage of maximum corresponds to motor RPMs as a percentage of maximum, when the system is in steady-state. The desired motor RPM value may be compared against the actual RPMs of drive motor 104 (as absolute values or percentages). If the desired motor RPM value is greater by a predetermined amount than the actual RPMs of drive motor 104, then this may indicate that the user desires to accelerate and additional power may be provided to drive motor 104.

Figure 13:
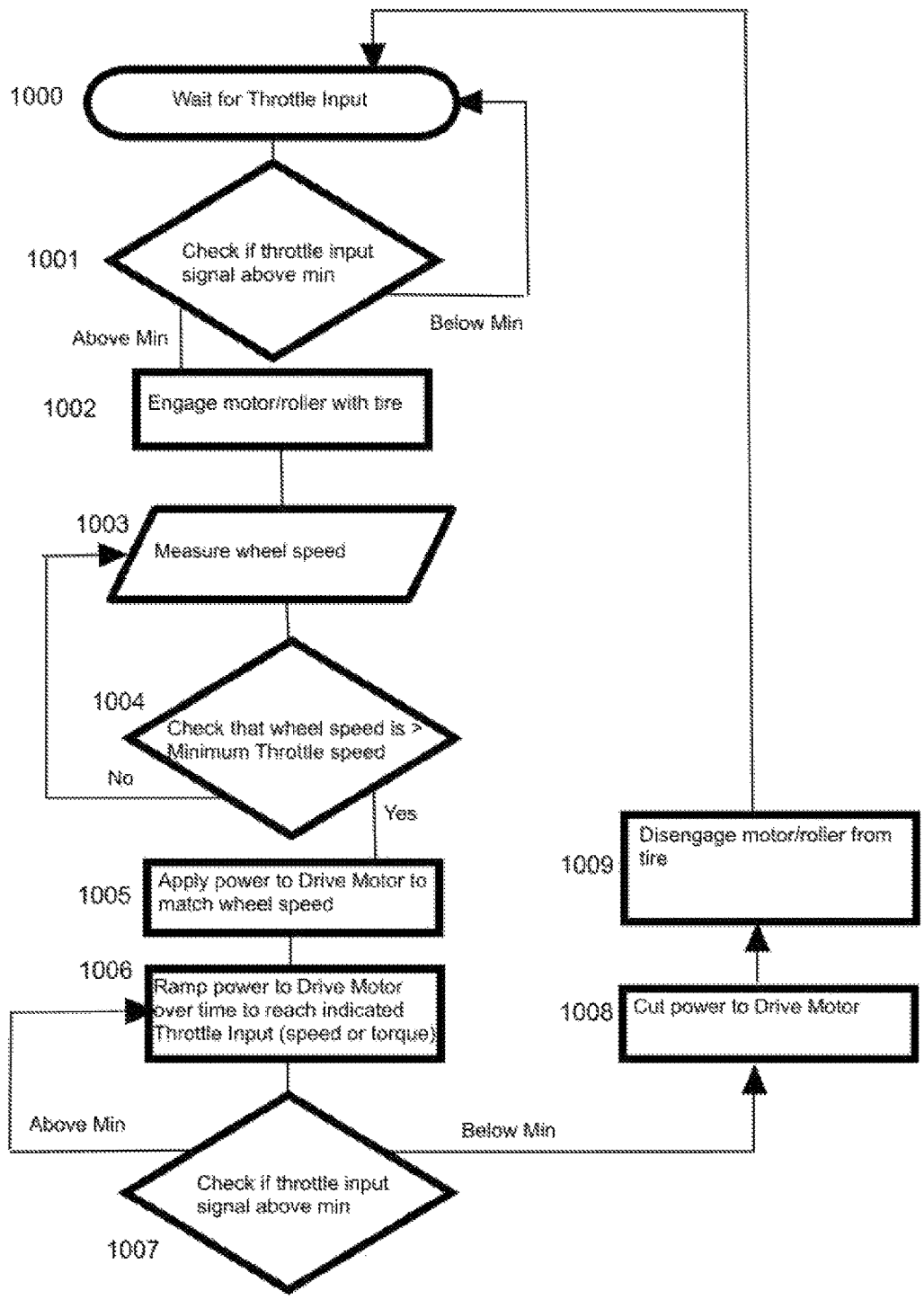
FIG. 13 shows an example of a flow chart for responding to depression and release of a throttle in embodiments of a friction drive system.

FIG. 13 shows an example of a flow diagram for responding to a throttle input signal that may be used in embodiments of friction drive system 100. For example, the flow diagram in FIG. 13 may be executed after one of the start-up routines of FIGS. 10A-B. In step 1000, control unit 101 may wait for a throttle input signal, for example, generated in response to a user pressing the throttle. In step 1001, control unit 101 may check if the throttle input signal is below a minimum value, min. If below min, the flow may return to step 1002 and continue checking the throttle input signal. If above min, the flow may proceed to step 1002 and contact surface 109 may be engaged with tire 202. If start-up routine 10A or 10B has already been executed, then the distance between contact surface 109 and tire 202 may be slight, such that engagement may occur rapidly. In step 1003, the wheel speed (or RPM) may be measured and optionally stored in memory. For example, the wheel speed may be determined from the speed of drive motor 104 (e.g., using known relationships) while in an unpowered state.

In step 1004 of FIG. 13, control unit 101 may check that the wheel speed (or motor speed) is above a minimum speed for providing power when in throttle mode ("Minimum Throttle Speed"). If the wheel speed is not greater than the Minimum Throttle Speed, then the flow may return to step 1003 and again measure the wheel speed. If the wheel speed is greater than the Minimum Throttle Speed, then the flow may proceed to step 1005 and electrical power may be provided to drive motor 104 such that the speed of contact surface 109 matches the speed of tire 202. As would be understood by a person of skill in the art in view of the present disclosure, the angular speeds (or RPMs) of contact surface 109 and tire 202 would likely not match, since the diameter of contact surface 109 will usually be much less than the diameter of tire 202; however, the tangential speeds of contact surface 109 and tire 202 would normally be equal when the motor is engaged, assuming no slippage. Thus, the algorithm of FIG. 13 would likely use tangential speeds or an equivalent measurement.

Still referring to FIG. 13, in step 1006 power to motor 104 may be ramped (e.g., increased or decreased) over time until a target value corresponding to the throttle input signal is reached. For example, the target value may be a speed, a motor torque, a motor power, or a motor current; and the target value may be calculated, looked-up, or otherwise determined from the throttle input signal (and/or other parameters). In step 1007, control unit 101 may check to determine if the throttle input signal is still above min if yes, then the flow returns to step 1006 and power to the drive motor is provided to maintain the current target value; the target value itself may vary over time based on the throttle input signal. If the throttle input drops below min, then power to drive motor 104 may be cut off in step 1008. In step 1009, contact surface 109 may be disengaged from the tire before returning to step 1000 and waiting for the throttle input signal. Step 1009 may occur after waiting for a predetermined period of time, for example, 30 seconds or 1 minute in order to avoid repeated disengagement and reengagement. In alternative embodiments, step 1009 may be skipped altogether and contact surface 109 may remain engaged with tire 202.

Figure 14:
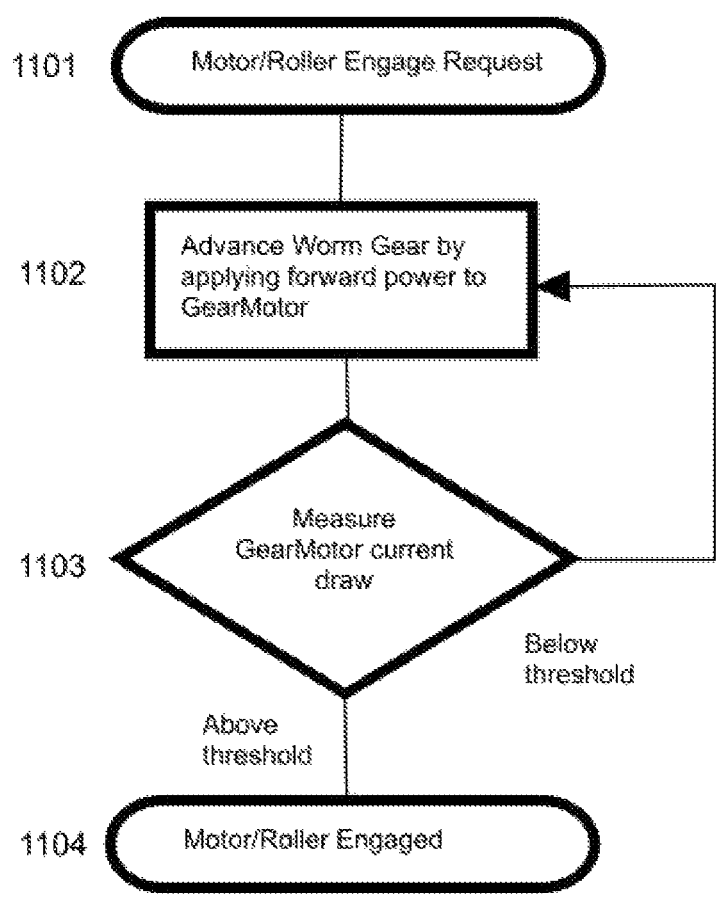
FIG. 14 shows an example of a flow chart for engaging a drive motor in embodiments of a friction drive system.

FIG. 14 shows an example of a flow diagram for engaging a contact surface of the drive motor (or roller) that may be used in embodiments of friction drive system 100. For example, the algorithm of FIG. 14 may be used to perform step 1002 of FIG. 13. In step 1101, a request may be received by software executing in control unit 101 to engage contact surface 109 with tire 202 (described in FIG. 14 as a request to engage a motor or roller). In step 1102, worm gear 142 may be advanced by a predetermined amount, for example, by applying forward power to gear motor 145. In step 1103, control unit 101 may compare the current draw of gear motor 145 to determine whether it exceeds a threshold value. If the threshold is not exceeded, then the flow may return to step 1102 and again advance worm gear 142. If the threshold is exceeded, then the flow may proceed to step 1104, because contact surface 109 is now engaged with tire 202 and drive motor 104 may begin delivering power.

In alternative embodiments, it also may be possible to determine when engagement has occurred by monitoring the RPMs of drive motor 104 in an unpowered state: if the wheeled vehicle is in motion, then the motor RPMs will be greater than zero once engagement occurs.

Referring to step 1103 of FIG. 14, the threshold level of current drawn by gear motor 145 may be predetermined and/or preset to provide an optimal amount of normal force (and, thus, friction) under normal operating conditions (e.g., dry conditions on a paved road). In other embodiments, the threshold level may be set dynamically based on detected conditions, such as moisture on tire 202, motor RPMs, battery state, and/or other parameters. In still other embodiments, the threshold level may be determined, at least in part, based on a mode selected by the user (e.g., "Tailwind", "High Traction", "Low Traction", etc.). In yet other embodiments, the threshold level may be set during the initialization process, for example, a certain amount between the minimum and maximum recorded values. It also may be possible to command worm gear 142 to a predetermined position (or a position set during initialization) without (or in addition to) monitoring current drawn by gear motor 145 (e.g., instead of step 1103).

Figure 15:
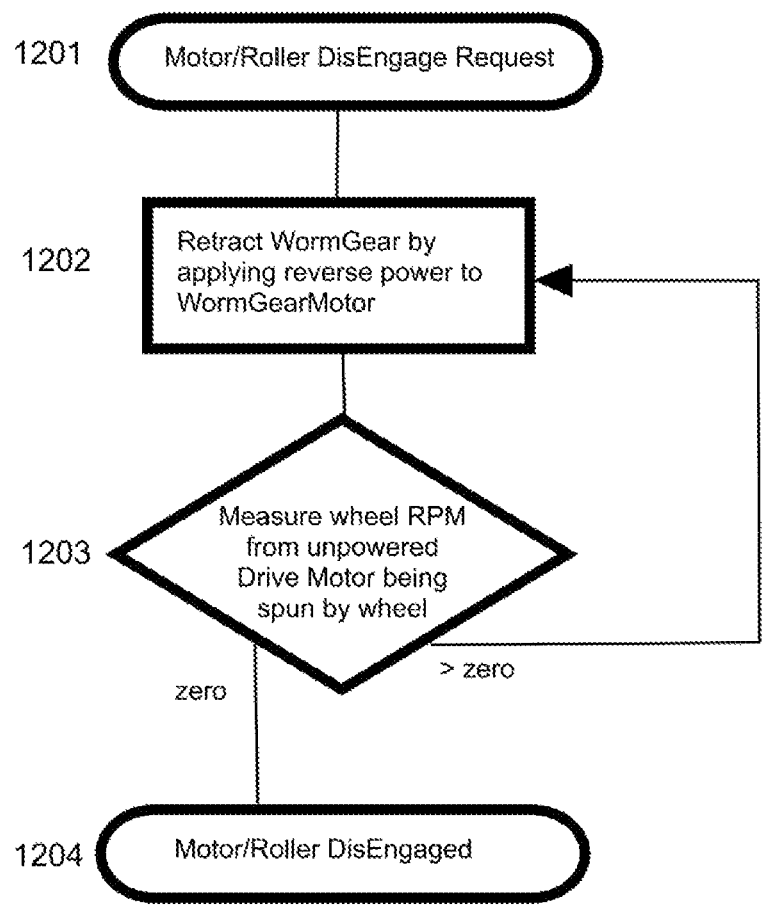
FIG. 15 shows an example of a flow chart for disengaging a drive motor in embodiments of a friction drive system.

FIG. 15 shows an example of a flow diagram for disengaging contact surface 109 of drive motor 104 (or a roller) that may be used in embodiments of friction drive system 100. For example, the algorithm of FIG. 15 may be used to perform step 1009 of FIG. 13; in step 1008 of FIG. 13, power to drive motor 104 may be cut before beginning the flow of FIG. 15. In step 1201 of FIG. 15, a request may be received by software executing in control unit 101 to disengage contact surface 109 from tire 202 (described in FIG. 15 as a request to disengage a motor or roller). In step 1202, worm gear 142 may be retracted by a predetermined amount, for example, by applying forward power to gear motor 145. In step 1203, control unit 101 may measure the RPM of drive motor 104 (when it is unpowered) to determine whether it exceeds zero. If the drive motor RPM is not zero, this indicates that disengagement has not occurred because the motor is still being spun by the wheel. In this case, the flow returns to step 1202 and worm gear 142 may be further retracted. If the motor RPM is zero, then the flow may proceed to step 1204, because disengagement has occurred.

Figure 16:
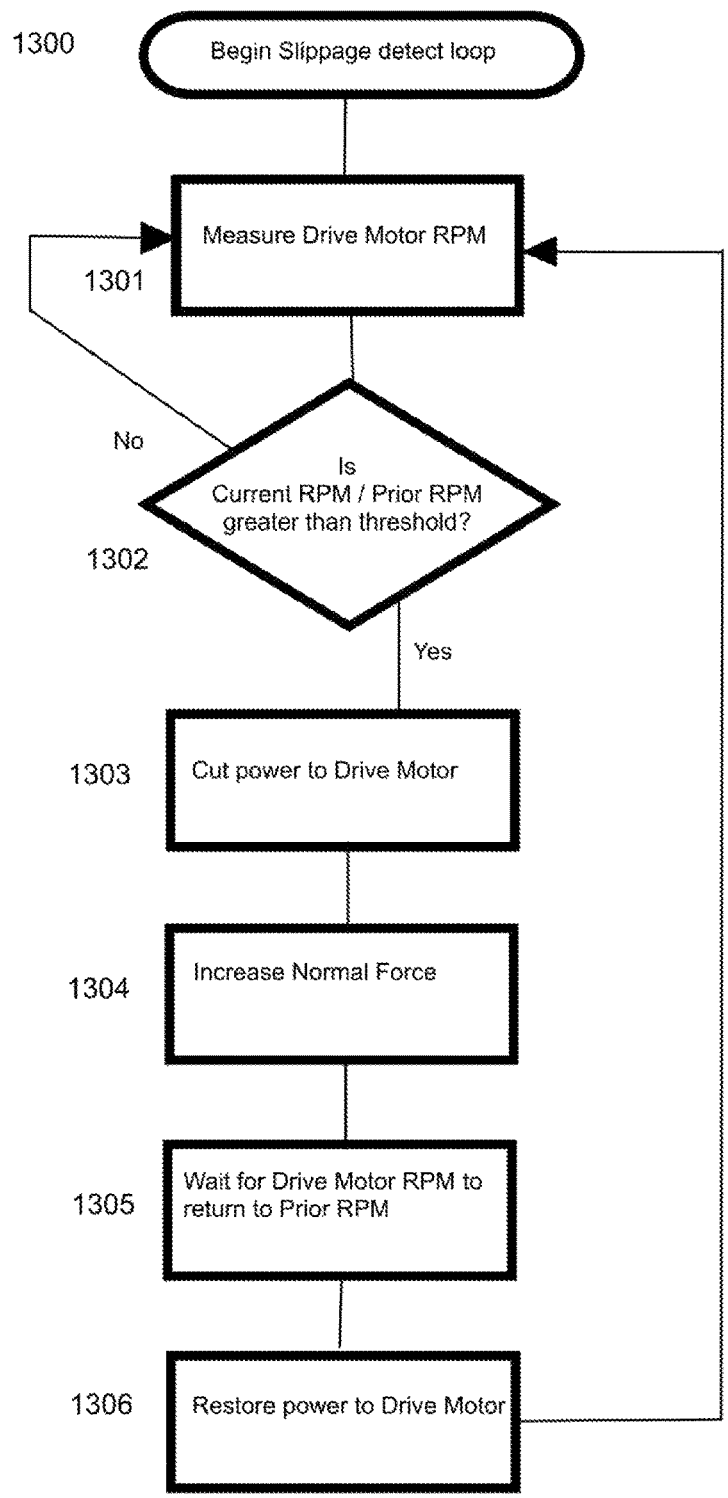
FIG. 16 shows an example of a flow chart for automatically detecting and correcting slippage that may be used in embodiments of friction drive system.

FIG. 16 shows an example of a flow diagram for automatically detecting and correcting slippage that may be used in embodiments of friction drive system 100. In step 1300, ATCS 150 (and/or control unit 101) may initiate traction control. For example, traction control may be initiated a predetermined time after engagement with the tire, as described in FIG. 14, or immediately after initiating Tailwind mode, as described in FIGS. 12A and 12B. Alternatively, in some embodiments, traction control may be initiated above a certain speed when the motor is engaged and providing power. In step 1301, ATCS 150 may measure the RPM of drive motor 104 ("motor RPM"). Alternatively (or in addition), the motor RPM may be provided to ATCS 150 by external software, circuitry, and/or sensors. The motor RPM may be stored in memory. In step 1302, a ratio of current motor RPM to a prior stored value of motor RPM may be generated and compared to a threshold value. In the first iteration of the loop, when there is no prior motor RPM value stored, motor RPM may be compared to itself or the comparison may be skipped and another value measured upon returning to step 1301, for example.

In step 1302, if the ratio of current motor RPM to prior motor RPM ("RPM ratio") exceeds a certain threshold (optionally, expressed as a percentage) for a given logic loop delay time, then it may be possible to deduce that slippage has occurred. This is true because motor RPM normally should not increase above a certain rate when contact surface 109 is engaged with tire 202, due to realistic acceleration limits determined by motor power output and typical weight of rider and bike or scooter. Thus, in effect, the threshold value of the RPM ratio sampled over a given period of time may represent a maximum allowed acceleration of drive motor 104 and wheeled vehicle 200 which friction drive system 100 is installed on. For example, in embodiments with a software loop period of 20 ms, a threshold value of 1.01 may be used to indicate that slippage has occurred, as this rate of change of RPM would indicate a 50% increase in RPM per second, likely exceeding realistic acceleration expectations for the given power and weight.

If the RPM ratio is below the threshold, then the flow may return to step 1301 and again measure the motor RPM. If the RPM ratio exceeds the threshold, then the flow may proceed to step 1302 and ATCS 150 may reduce (including up to cutting completely) power to drive motor 104. In step 1304, the normal force between contact surface 109 and tire 202 may be increased by a preset amount, for example, by applying forward power to gear motor 145 for a certain amount of time, increments, degrees, or rotations. In step 1305, ATCS 150 may wait for the motor RPM to return to a prior value (e.g., before the acceleration spike), which may indicate that slippage has stopped. In many cases, it should take no more than about 0.5 seconds from reducing (or cutting) power to drive motor 104 in step 1303 for the motor RPM to return to a prior value. Once the motor RPM returns to a prior value, indicating that slippage has likely stopped, power may be restored to drive motor 104 in step 1306 and the flow may return to step 1301.

In alternative embodiments of a slippage detection loop, in step 1305, ATCS 150 may wait a predetermined amount of time, such as 0.2 to 0.5 seconds, before restoring power to drive motor 104 in step 1306. In still other embodiments of a slippage detection loop, in step 1305, a wheel speed may be detected, and ATCS 150 may wait for the motor speed to equal the wheel speed (indicating that slippage has stopped) before restoring power to drive motor 104 in step 1306.

Figure 17:
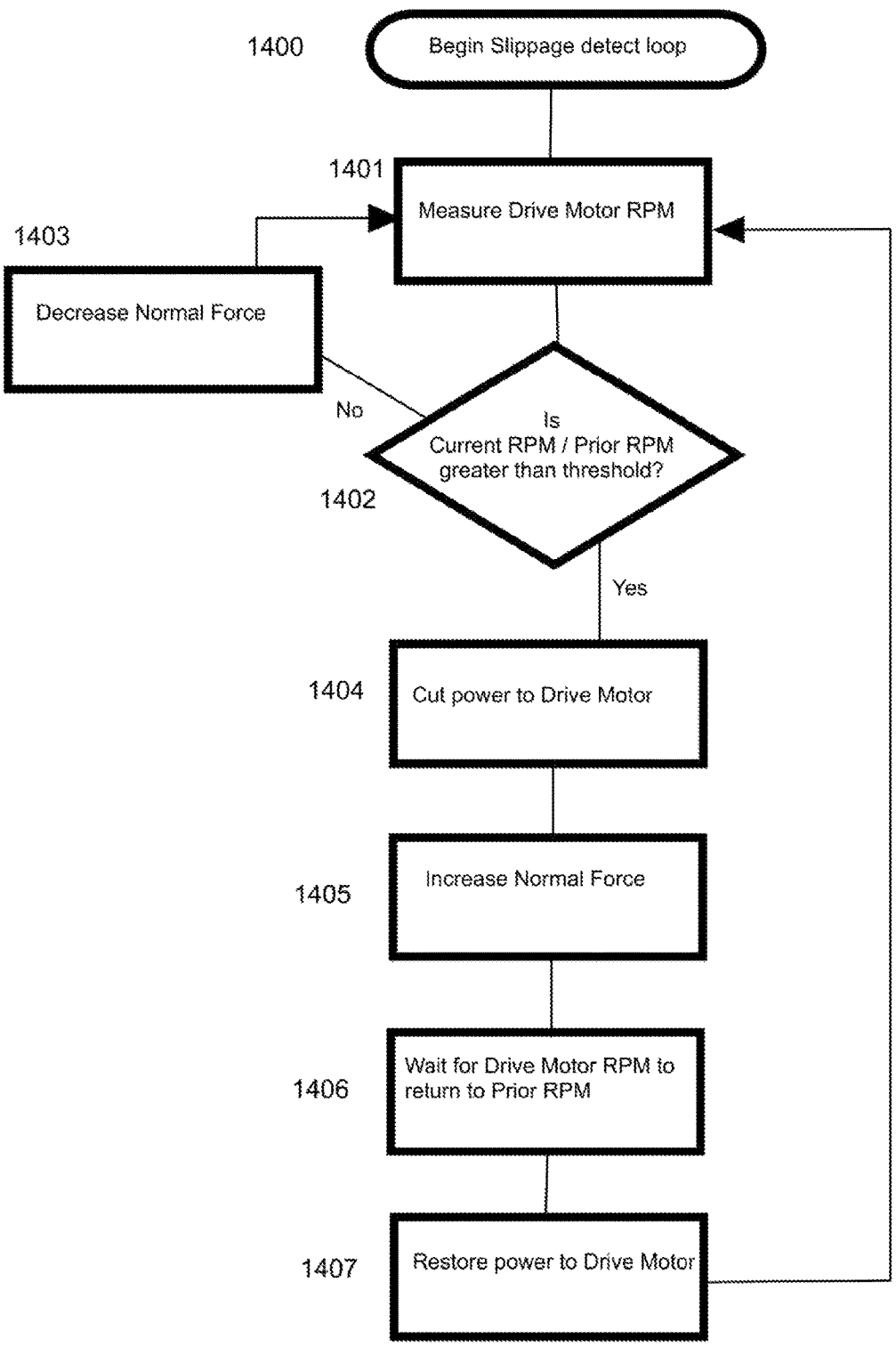
FIG. 17 shows another example of a flow chart for automatically detecting and correcting slippage that may be used in embodiments of friction drive system.

FIG. 17 shows another example of a flow diagram for automatically detecting and correcting slippage that may be used in embodiments of friction drive system 100. In step 1400, ATCS 150 (and/or control unit 101) may initiate traction control. For example, traction control may be initiated a predetermined time after engagement with the tire, as described in FIG. 14, or immediately after initiating Tailwind mode, as described in FIGS. 12A and 12B. Alternatively, in some embodiments, traction control may be initiated above a certain speed when the motor is engaged and providing power. In step 1401, ATCS 150 may measure the motor RPM. Alternatively (or in addition), the motor RPM may be provided to ATCS 150 by external software, circuitry, and/or sensors. The motor RPM may be stored in memory. In step 1402, a ratio of current motor RPM to a prior stored value of motor RPM may be generated and compared to a threshold value. In the first iteration of the loop, when there is no prior motor RPM value stored, motor RPM may be compared to itself or the comparison may be skipped and another value measured upon returning to step 1401, for example. In step 1402, if the ratio of current motor RPM to prior motor RPM ("RPM ratio") exceeds a certain threshold, then it may be possible to deduce that slippage has occurred, as previously described with respect to step 1302 of FIG. 16.

If the RPM ratio does not exceed a certain threshold, then the normal force may be decreased in step 1403, for example, by applying reverse power to gear motor 145 for a certain amount of time, increments, degrees, or rotations. If the RPM ratio exceeds the threshold, then the flow may proceed to step 1404 and power to drive motor 104 may be reduced (including up to cutting completely). In step 1405, the normal force between contact surface 109 and tire 202 may be increased by a preset amount, for example, by applying forward power to gear motor 145 for a certain amount of time, increments, degrees, or rotations. In step 1406, ATCS 150 may wait for the motor RPM to return to a prior value (e.g., before the acceleration spike), which may indicate that slippage has stopped. In many cases, it should take no more than about 0.5 seconds from reducing (or cutting) power to drive motor 104 in step 1404 for the motor RPM to return to a prior value. Once the motor RPM returns to a prior value, indicating that slippage has likely stopped, power may be restored to drive motor 104 in step 1407 and the flow may return to step 1401.

Using the embodiment of FIG. 17, it may be possible to maintain the normal force at an optimal level, such that a minimal amount of normal force is applied without slippage. As one of skill in the art would understand in view of the present disclosure, hysteresis may be built into loop 1402, such that some amount of variation is tolerated in the RPM ratio before adjusting the amount of normal force.

Figure 18:
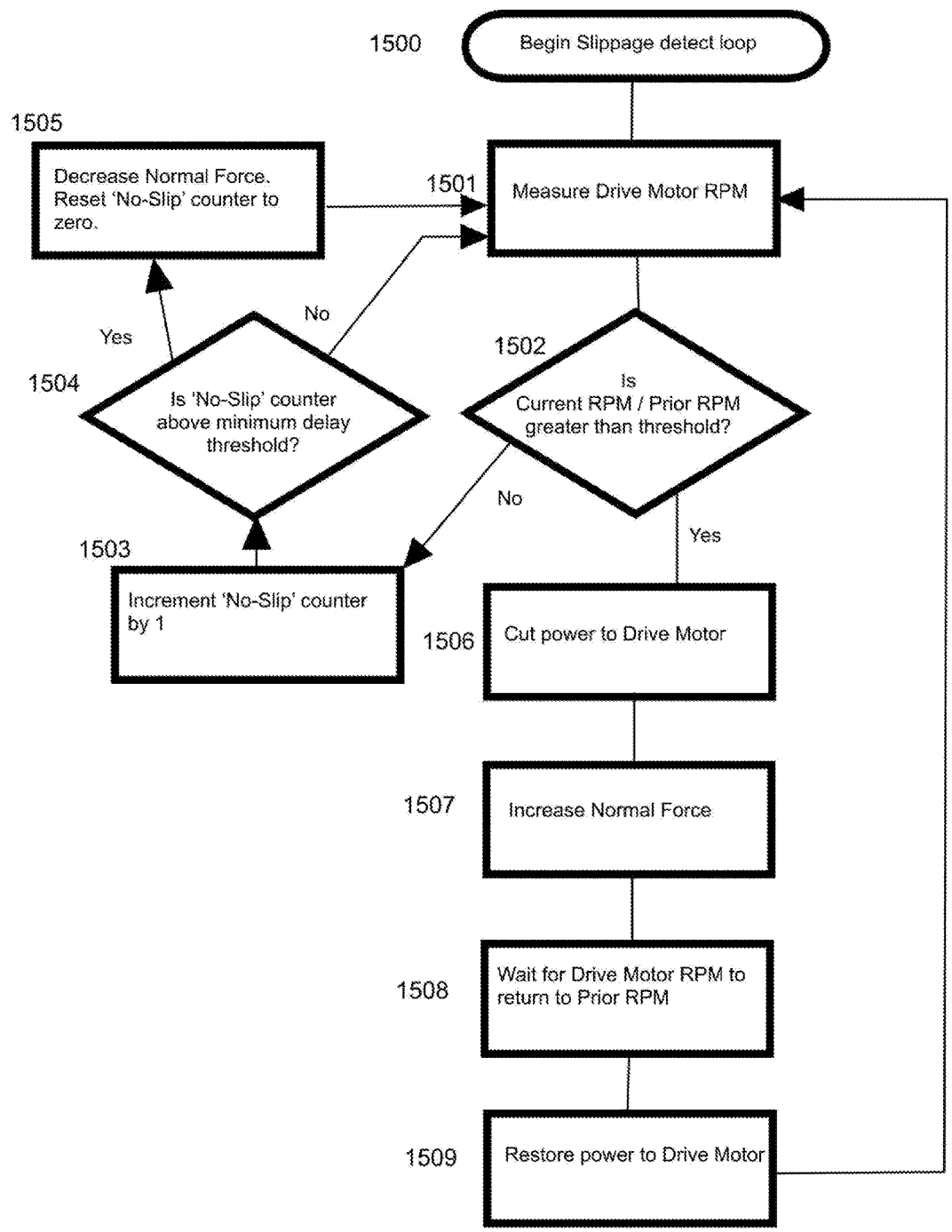
FIG. 18 shows yet another example of a flow chart for automatically detecting and correcting slippage that may be used in embodiments of friction drive system.

FIG. 18 shows yet another example of a flow diagram for automatically detecting and correcting slippage that may be used in embodiments of friction drive system 100. In step 1500, ATCS 150 (and/or control unit 101) may initiate traction control. For example, traction control may be initiated a predetermined time after engagement with the tire, as described in FIG. 14, or immediately after initiating Tailwind mode, as described in FIGS. 12A and 12B. Alternatively, in some embodiments, traction control may be initiated above a certain speed when the motor is engaged and providing power. In step 1501, ATCS 150 may measure the motor RPM. Alternatively (or in addition), the motor RPM may be provided to ATCS 150 by external software, circuitry, and/or sensors. The motor RPM may be stored in memory. In step 1502, a ratio of current motor RPM to a prior stored value of motor RPM may be generated and compared to a threshold value. In the first iteration of the loop, when there is no prior motor RPM value stored, motor RPM may be compared to itself or the comparison may be skipped and another value measured upon returning to step 1501, for example. In step 1502, if the ratio of current motor RPM to prior motor RPM ("RPM ratio") exceeds a certain threshold, then it may be possible to deduce that slippage has occurred, as previously described with respect to step 1302 of FIG. 16.

In step 1502, if the RPM ratio does not exceed the threshold, then the flow may proceed to step 1503 and a "no-slip" counter may be incremented, for example, by 1. In step 1504, ATCS 150 may check if the "no-slip" counter is above a minimum threshold (e.g., 10). If not, then the flow may return to step 1501 and motor RPM may be measured again. If yes, then the flow may proceed to step 1505, where the normal force may be decreased, for example, by applying reverse power to gear motor 145 for a certain amount of time, increments, degrees, or rotations. In step 1505, the "no-slip" counter also may be reset. The use of a "no-slip" counter provides a delay before decreasing the normal force, which may prevent rapid changes to the normal force and increase consistency of operation.

If the RPM ratio exceeds the threshold, then the flow may proceed to step 1506 and power to drive motor 104 may be cut (or reduced). In step 1507, the normal force between contact surface 109 and tire 202 may be increased by a preset amount, for example, by applying forward power to gear motor 145 for a certain amount of time, increments, degrees, or rotations. In step 1508, ATCS 150 may wait for the motor RPM to return to a prior value (e.g., before the acceleration spike), which may indicate that slippage has stopped. In many cases, it should take no more than about 0.5 seconds from cutting (or reducing) power to drive motor 104 in step 1506 for the motor RPM to return to a prior value. Once the motor RPM returns to a prior value, indicating that slippage has likely stopped, power may be restored to drive motor 104 in step 1509 and the flow may return to step 1501.

Embodiments of friction drive system 100 described herein may use regenerative charging and/or braking to restore power to battery unit 102 when wheeled vehicle 200 brakes. For example, by leaving contact surface 109 engaged with tire 202 during braking, it may be possible to generate a reverse current in drive motor 104 that may be used to power rechargeable batteries in battery unit 102. In addition, because the system may control normal force independently from drive motor direction and torque, it may be possible to employ regenerative braking by simultaneously reversing direction of drive motor 104 while also increasing normal force, thereby applying high braking force to the wheel while regeneratively charging battery unit 102. Such a regenerative braking system also may offer the safety benefit of a secondary braking system for the bicycle or scooter (or other wheeled vehicle) which friction drive system 100 is mounted on.

Embodiments of friction drive system 100 may include electrical components for charging the battery, for powering lights, for charging external devices, and for other purposes. These electrical components may be provided within control unit 101, battery unit 102, drive assembly 103, case 120, and/or separately. For example, drive assembly 103 may include lights powered by battery unit 102. As another example, case 120 may include one or more USB ports for powering (or charging) external devices (e.g., cell phones, lights, cameras, etc.) using power from battery unit 102. As yet another example, battery unit 102 may a include plug (and associated circuitry) for connecting with a standard electrical outlet to charge battery unit 102. Thus, friction drive system 100 (and/or battery unit 102) may be used as a portable power supply capable of powering various electrical devices, both on and off a wheeled vehicle.

Embodiments of friction drive system 100 also may include software for collecting information and/or performing calculations related to performance, diagnostics, and/or tracking and for outputting related information to a display (e.g., LCD or LED screen) disposed on friction drive system 100; alternatively or in addition, information may be output to an application ("APP") running on an external device, such as a smartphone or computer, for processing and/or display there. For example, software running on a processor within control unit 100 may use information gathered from battery 102, drive assembly 103, and/or wheeled vehicle 200 to perform calculations and output the speed, battery charge, battery efficiency, and/or projected range (among other things) for display. A projected range may be continuously updated in near real-time as friction drive system 100 is used, based on information such as battery charge, distance traveled, vehicle speed, and/or motor speed.

In embodiments of the disclosure, software running on a processor within control unit 100 (or elsewhere) also may control the mode and/or settings of friction drive system 100 in response to a user input. For example, a user may operate a user interface (e.g., by pressing buttons) to select a traction mode, to set maximum power and/or speed limits, to set when the motor should begin delivering power, and/or to adjust other settings. For example, a user may select to power motor 104 only when a certain threshold of vehicle (or pedal) speed is exceeded. In some embodiments, a user may select the traction mode—such as "dry" or "wet"—directly via the APP. As already explained, the APP also may display information such as distance, location, battery power, battery efficiency, projected range, and so forth. The APP may also store information and display information over time and/or historical performance metrics.

In view of the present disclosure, a person of skill in the art would understand that embodiments described as engaging with a tire could be modified to engage with other parts of the wheel, such as the rim. A person of skill in the art would also understand that embodiments in which a contact surface on the motor engages directly with the tire may be modified such that a contact surface on one or more rollers—which may be powered by the motor—engages with the tire or wheel; in this case, the motor may be enclosed within the casing. A person of skill in the art would also understand that embodiments described with respect to bicycles may be modified to work on other wheeled vehicles, such as scooters, skateboards, wheelchairs, and the like. A person of skill in the art would also understand that embodiments described herein have applications beyond wheeled vehicles, including with motorcycles, remote control vehicles, wind turbines, manufacturing systems, conveyor belts, railcars, trains, printers, toys and consumer devices, among other devices.

Advantages of embodiments of friction drive systems disclosed herein include, without limitation, the ability to add or remove electric friction drive power to a standard non-electric bike or scooter in seconds, the ability to use electric friction drive on multiple bikes and/or scooters interchangeably (including with folding bikes and kick scooters), and the ability to carry spare electric friction drive power in a briefcase or bag to be used whenever it is needed. In addition, embodiments of a friction drive system disclosed herein are portable and can easily be taken with the user to prevent theft of valuable e-bike components.

Other advantages of friction drive systems and control algorithms disclosed herein include the ability to automatically adjust the amount of friction delivered in order to prevent slippage and adjust for changing conditions, which also may increase battery life and decrease tire wear. Other advantages disclosed herein include safer operation of a friction drive system. For example, by turning off power to the drive motor when slippage is detected, embodiments disclosed herein may prevent the tire from suddenly reengaging (or catching) with the contact surface. Other advantages disclosed herein include automatic and rapid engagement and disengagement of the contact surface with the tire on-demand.

Embodiments of friction drive systems disclosed herein may be used with bike share bicycles and, advantageously, may provide electric power to a bike share bicycle without requiring the expense or complexity of conventional electric bicycles, which typically require battery swap functionality and multi-battery docking stations for bike share use. Additionally, embodiments disclosed herein allow individuals to add electric power to a bike share bicycle when it would otherwise not be available. This allows individuals to experience the benefits of electric bicycles including reduced effort, faster speed, and longer range, while taking advantage of the benefits of a bike share program. Embodiments disclosed herein also allow bike share operators to benefit from increased membership due to the attractiveness of electric power to individuals, and higher asset utilization of their bike share fleet, as the higher speeds enabled by electric power shorten the time needed for an individual to complete a trip and allow the bike to be returned to the dock and checked out by another user more quickly.

It should be understood that, while various embodiments have been described herein, the claimed invention(s) should not be limited by those embodiments. To the contrary, the foregoing summary, detailed description, figures, and abstract have been presented for illustrative purposes, and are not meant to limit the claims. Indeed, as a person of skill in the art in view of the present disclosure would recognize, various changes can be made to the embodiments described herein without departing from the scope and spirit of the present invention(s).

The invention claimed is:

1. A friction drive system, comprising:
   a drive assembly comprising a motor and a contact surface capable of engaging with a tire of a wheeled vehicle; and a control unit comprising an automatic traction control system, wherein the automatic traction control system comprises a normal force adjustment mechanism capable of automatically increasing an amount of normal force between the contact surface and the tire after slippage is detected, when the friction drive system is mounted to the wheeled vehicle, and wherein slippage is detected by determining whether a speed of the motor has increased.

2. The friction drive system of claim 1, further comprising:

a battery unit, wherein the control unit determines an amount of electrical current to deliver from the battery unit to the motor based at least in part on an input signal.

3. The friction drive system of claim 2, wherein the control unit determines the amount of electrical current to deliver from the battery unit to the motor based at least in part on a sensed motor speed or a sensed motor current draw.

4. The friction drive system of claim 2, wherein the input signal is provided by at least one of a throttle mechanism or a pedal assist sensor.

5. The friction drive system of claim 2, wherein the automatic traction control system is capable of reducing the amount of electrical current delivered from the battery unit to the motor, while continuing to deliver the electrical current from the battery unit to the motor, when slippage is detected between the contact surface and the tire.

6. The friction drive system of claim 1, wherein the automatic traction control system detects slippage by determining whether a speed of the motor has increased by more than a maximum threshold value for a sampling period.

7. The friction drive system of claim 1, wherein the automatic traction control system is capable of increasing power to the motor after increasing the amount of normal force with the normal force adjustment mechanism such that slippage is no longer detected.

8. The friction drive system of claim 1, wherein the normal force adjustment mechanism comprises a pivot mechanism, and wherein the automatic traction control system is capable of adjusting the amount of normal force by changing an angle of the pivot mechanism.

9. The friction drive system of claim 8, wherein the pivot mechanism comprises a worm gear.

10. The friction drive system of claim 9, wherein the automatic traction control system controls the angle of the pivot mechanism by powering the worm gear with a gear motor.

11. The friction drive system of claim 10, wherein the automatic traction control system monitors a current draw of the gear motor to determine when the contact surface is disengaged from the tire.

12. The friction drive system of claim 10, wherein the automatic traction control system monitors the revolutions of the worm gear to determine when the contact surface is disengaged from the tire.

13. The friction drive system of claim 1, wherein the normal force adjustment mechanism comprises a linear adjustment mechanism, and wherein the automatic traction control system is capable of adjusting the amount of normal force by changing a position of the linear adjustment mechanism relative to the tire.

14. A friction drive system, comprising:

a drive assembly comprising a motor and a pivot mechanism, wherein a contact surface is disposed on the motor, and the motor is attached to an end of the pivot mechanism;

a sensor that senses a condition of the motor; and an automatic traction control system capable of automatically adjusting an angle of the pivot mechanism in response to the sensed condition.

15. The friction drive system of claim 14, wherein the sensed condition comprises at least one of a motor speed, a motor position, or a motor current.

16. The friction drive system of claim 14 further comprising a battery unit and a control unit, wherein the control unit determines an amount of electrical current to deliver from the battery unit to the motor.

17. The friction drive system of claim 14, wherein the pivot mechanism comprises a worm gear and a gear motor.

18. The friction drive system of claim 17, wherein the automatic traction control system adjusts the angle of the pivot mechanism by powering the worm gear with the gear motor.

19. A friction drive system, comprising:

a battery unit capable of delivering power to a drive assembly, wherein the drive assembly comprises a motor and a contact surface;

a sensor that senses a condition of the motor; and traction control means for automatically controlling an amount of normal force delivered by the contact surface in response to the sensed condition.

20. The friction drive system of claim 19, wherein the drive assembly further comprises a pivot mechanism and the contact surface is disposed on a rotating mechanism attached to the pivot mechanism; wherein the rotating mechanism is powered by the motor.

21. The friction drive system of claim 20, wherein the traction control means is capable of controlling an angle of the pivot mechanism.

22. The friction drive system of claim 21, wherein the one or more sensed conditions includes at least one of a motor speed, a motor position, or a motor current.

23. A friction drive system, comprising:

a motor;

a battery capable of supplying power to the motor;

a drive position adjustment mechanism; and an automatic traction control system comprising a computer processor and a computer readable medium, wherein the computer readable medium comprises computer program instructions for instructing the drive position adjustment mechanism to adjust a position of a contact surface relative to a mounting mechanism, in response to information measured by a sensor.

24. The friction drive system of claim 23, wherein the drive position adjustment mechanism comprises a pivot mechanism, wherein the contact surface is disposed on a rotating mechanism attached to the pivot mechanism, and wherein the rotating mechanism is driven by the motor.

25. The friction drive system of claim 24, wherein the position of the contact surface is adjusted by controlling an angle of the pivot mechanism in response to an instruction from the computer processor.

* * * * *